(12) United States Patent
Salkintzis

(10) Patent No.: US 12,133,284 B2
(45) Date of Patent: Oct. 29, 2024

(54) PROVISIONING A REMOTE UNIT VIA A BLOCKCHAIN NETWORK

(71) Applicant: Lenovo (Singapore) PTE. LTD., New Tech Park (SG)

(72) Inventor: Apostolis Salkintzis, Athens (GR)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 999 days.

(21) Appl. No.: 16/954,128

(22) PCT Filed: Feb. 19, 2018

(86) PCT No.: PCT/EP2018/053997
§ 371 (c)(1),
(2) Date: Jun. 15, 2020

(87) PCT Pub. No.: WO2019/158213
PCT Pub. Date: Aug. 22, 2019

(65) Prior Publication Data
US 2023/0156455 A1    May 18, 2023

(51) Int. Cl.
*G06Q 20/00* (2012.01)
*G06Q 20/38* (2012.01)
(Continued)

(52) U.S. Cl.
CPC .......... *H04W 8/18* (2013.01); *G06Q 20/3827* (2013.01); *G06Q 20/401* (2013.01); *H04W 12/61* (2021.01)

(58) Field of Classification Search
CPC ....... H04W 8/18; H04W 12/61; H04W 12/35; H04W 12/40; H04W 12/04; H04W 12/63;
(Continued)

(56) References Cited

U.S. PATENT DOCUMENTS

2015/0349825 A1    12/2015    Lee et al.
2018/0294966 A1*   10/2018    Hyun ................... H04L 9/3226

OTHER PUBLICATIONS

PCT/EP2018/053997, "Notification of Transmittal of the International Search Report and the Written Opinion of the International Searching Authority, or the Declaration", Patent Cooperation Treaty, Oct. 31, 2018, pp. 1-16.
(Continued)

*Primary Examiner* — Dante Ravetti
(74) *Attorney, Agent, or Firm* — Kunzler Bean & Adamson

(57) ABSTRACT

Apparatuses, methods, and systems are disclosed for provisioning a remote unit via a smart contract in a blockchain network. One apparatus includes a processor and a transceiver, wherein the processor controls the transceiver to emit a first event in response to receiving a first blockchain message from a first blockchain address and collect a plurality of second blockchain messages. Here, the first event including information about a remote unit and each second blockchain message containing a subscription offer for the remote unit. The transceiver emits a second event in response to receiving a third blockchain message from the first blockchain address. Here, the third blockchain message including user selection of one of the collected subscription offers. The transceiver receives a fourth blockchain message containing provisioning data for the remote unit and emits a third event after successfully validating the fourth blockchain message. Here, the third event comprising the provisioning data for the remote unit.

20 Claims, 13 Drawing Sheets

(51) Int. Cl.
  *G06Q 20/40*    (2012.01)
  *H04W 8/18*    (2009.01)
  *H04W 12/61*    (2021.01)

(58) Field of Classification Search
  CPC . H04W 60/00; G06Q 20/3827; G06Q 20/401;
                  G06Q 20/065; G06Q 20/3678
  USPC ................ 705/16, 21, 59; 380/44, 262, 278
  See application file for complete search history.

(56) References Cited

OTHER PUBLICATIONS

Blockchain Telecom, "Bubbletone blockchain", edocr, Techcelerate Ventures, Mar. 19, 2018, pp. 1-18 part 1.
Blockchain Telecom, "Bubbletone blockchain", edocr, Techcelerate Ventures, Mar. 19, 2018, pp. 1-18 part 2.
GSMA, Remote Provisioning Architecture for Embedded UICC Technical Specification Version 3.2, GSM Association, Jun. 27, 2017, pp. 1-309.

\* cited by examiner

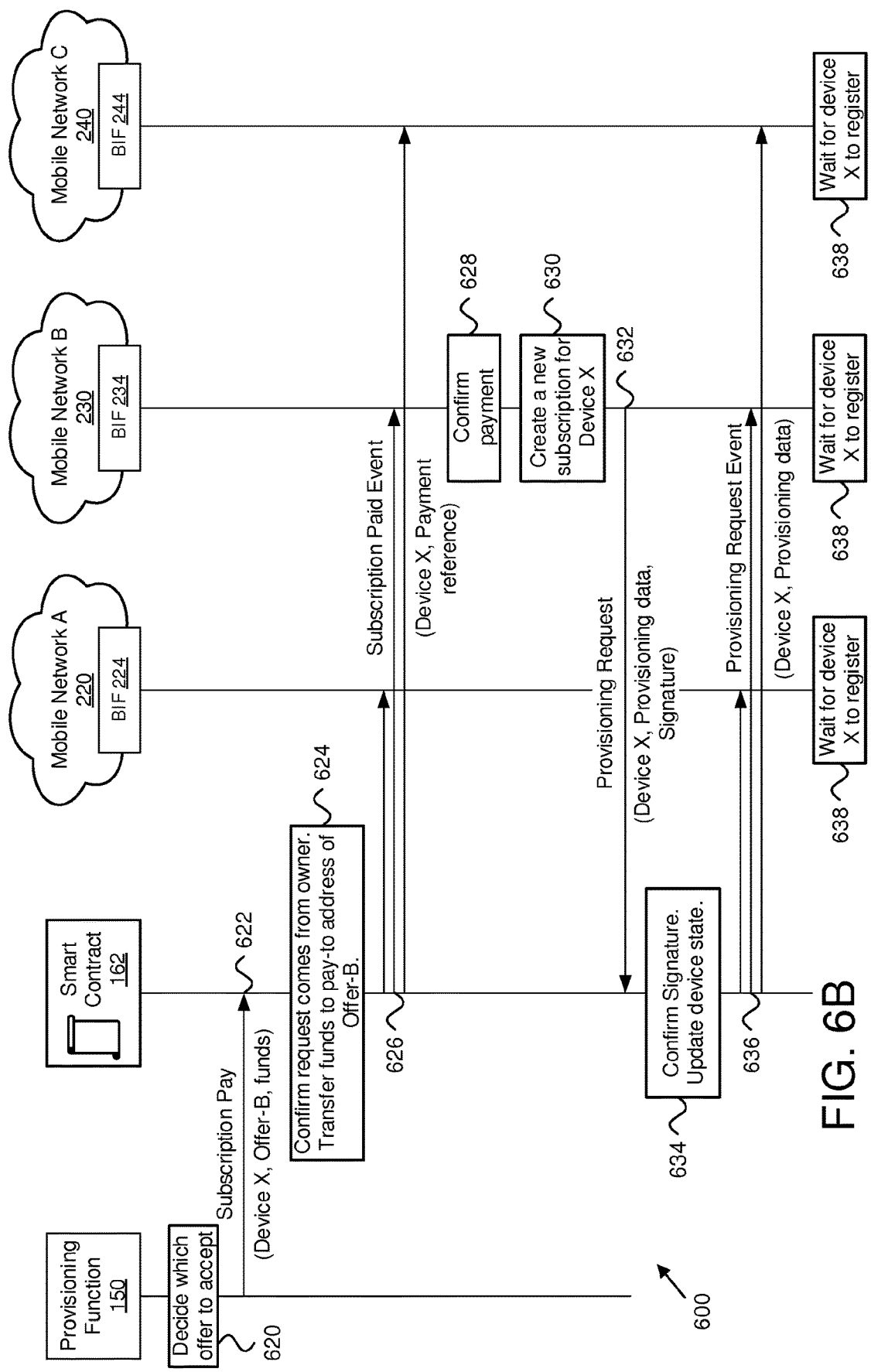

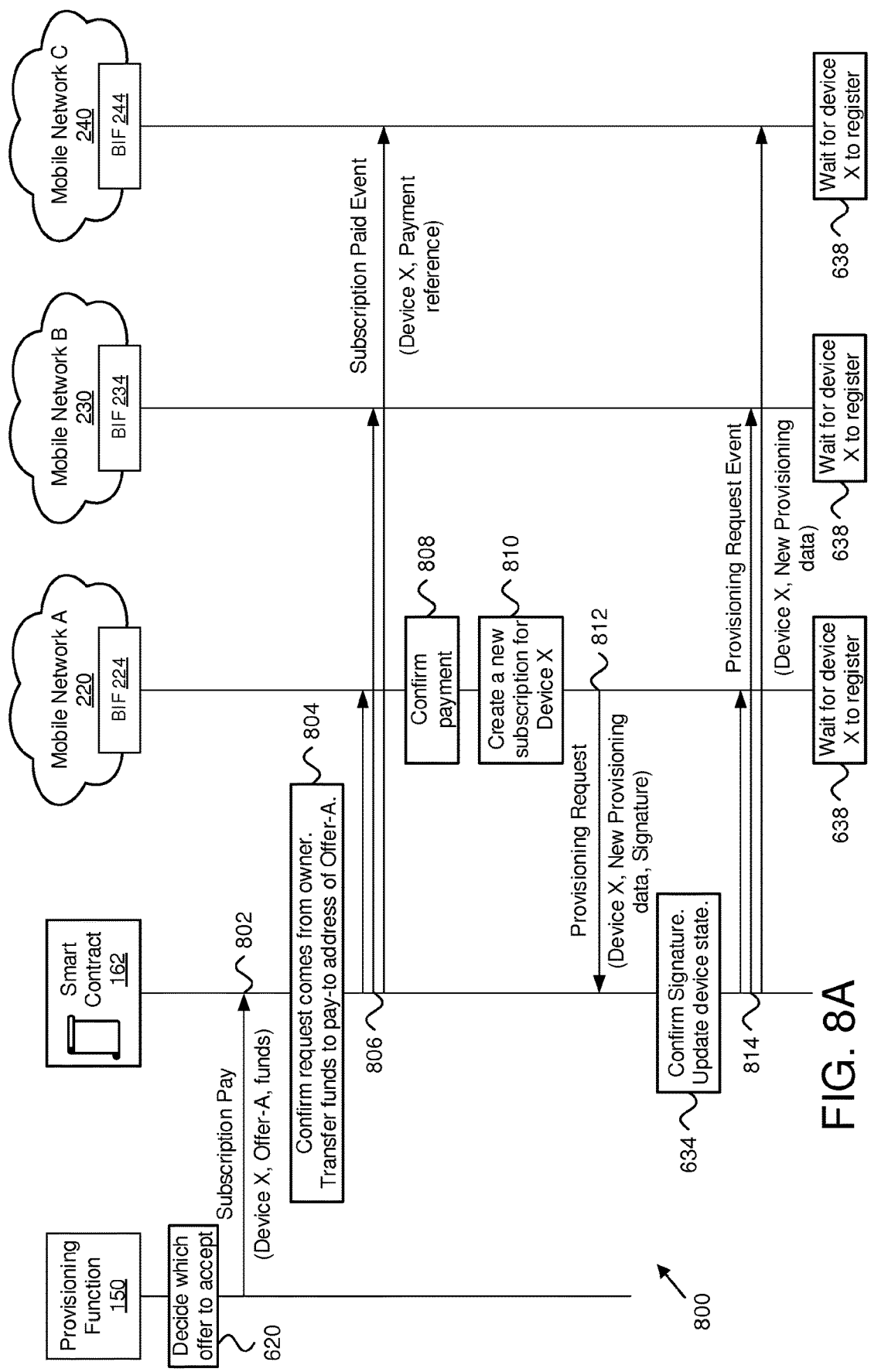

PROVISIONING A REMOTE UNIT VIA A BLOCKCHAIN NETWORK

FIELD

The subject matter disclosed herein relates generally to wireless communications and more particularly relates to provisioning a remote unit via a smart contract in a blockchain network.

BACKGROUND

The following abbreviations and acronyms are herewith defined, at least some of which are referred to within the following description.

Third Generation Partnership Project ("3GPP"), Authentication, Authorization & Accounting ("AAA"), Access and Mobility Management Function ("AMF"), Carrier Aggregation ("CA"), Clear Channel Assessment ("CCA"), Control Channel Element ("CCE"), Channel State Information ("CSI"), Common Search Space ("CSS"), Downlink Control Information ("DCI"), Downlink ("DL"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Network Function ("NF"), Next Generation Node B ("gNB"), Policy Control & Charging ("PCC"), Policy Control Function ("PCF"), Quality of Service ("QoS"), Quadrature Phase Shift Keying ("QPSK"), Radio Resource Control ("RRC"), Receive ("RX"), Switching/Splitting Function ("SSF"), Scheduling Request ("SR"), Session Management Function ("SMF"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Ultra-reliability and Low-latency Communications ("URLLC"), and Worldwide Interoperability for Microwave Access ("WiMAX").

Certain UEs are equipped with an embedded UICC ("eUICC") containing only a bootstrap profile, e.g., configured by the eUICC manufacturer. Such an eUICC does not contain an operational profile, e.g., associated with a subscription with a certain network operator/carrier. Here, the operational profile is to be provisioned to the UE over-the-air ("OTA"). One example of a UE with a bootstrap profile, but no operational profile is an IoT device. An operational profile includes a permanent subscription identity and the necessary security credentials that enable the UE to connect with and utilize the services of the mobile network operator.

While conventional wireless network specifications enable a device to be remotely provisioned OTA, these all require a pre-existing subscription with a certain network operator/carrier. Typically, the device owner must contact one or more multiple mobile network operators, negotiate subscription options, and then the owner generally makes a deal with the mobile network operator that offers the best subscription. This can be a lengthy and painful process that may involve a lot of investigation online and negotiations offline.

BRIEF SUMMARY

Methods for provisioning a remote unit via a smart contract in a blockchain network are disclosed. Apparatuses and systems also perform the functions of the methods. In some embodiments, a method for provisioning a remote unit via a smart contract in a blockchain network includes emitting a first event in response to receiving a first blockchain message from a first blockchain address, the first event including information about a remote unit, and collecting a plurality of second blockchain messages, each second blockchain message containing a subscription offer for the remote unit. Said method includes emitting a second event in response to receiving a third blockchain message from the first blockchain address, the third blockchain message including user selection of one of the collected subscription offers, and receiving a fourth blockchain message containing provisioning data for the remote unit. Said method also includes emitting a third event after successfully validating the fourth blockchain message, the third event including the provisioning data for the remote unit A corresponding apparatus for provisioning a remote unit via a smart contract in a blockchain network includes a processor and a transceiver, wherein the processor controls the transceiver to emit a first event in response to receiving a first blockchain message from a first blockchain address and collect a plurality of second blockchain messages, the first event including information about a remote unit and each second blockchain message containing a subscription offer for the remote unit. The transceiver further emits a second event in response to receiving a third blockchain message from the first blockchain address, the third blockchain message including user selection of one of the collected subscription offers. The transceiver also receives a fourth blockchain message containing provisioning data for the remote unit and emits a third event after successfully validating the fourth blockchain message, the third event comprising the provisioning data for the remote unit.

In one embodiment, a method for provisioning a remote unit via a smart contract in a blockchain network includes receiving a first event from a blockchain smart contract and receiving a second event from the blockchain smart contract, the first event including information about a remote unit and the second event including a first blockchain pay-to address. Said method includes receiving a third event from the smart contract, the third event including provisioning data for the remote unit and receiving an indication that the remote unit is reachable. Said method also includes transferring the provisioning data to the remote unit, e.g., in response to the remote unit being reachable.

A corresponding apparatus for provisioning a remote unit via a smart contract in a blockchain network includes a processor and a transceiver, wherein the processor controls the transceiver to: receive a first event from a blockchain smart contract, the first event including information about a remote unit; receive a second event from the blockchain smart contract, the second event including a first blockchain pay-to address; receive a third event from the smart contract, the third event comprising provisioning data for the remote unit; receive an indication that the remote unit is reachable; and transfer the provisioning data to the remote unit.

A system for provisioning a remote unit via a smart contract in a blockchain network includes a provisioning function, a blockchain node comprising a smart contact associated with a first address in a blockchain network, and a first blockchain interface function located in a first mobile communication network. The provisioning function sends, to the first address, a first blockchain message including information about a remote unit. The smart contact emits a first event in response to the first blockchain message. The first blockchain interface function transmits a second blockchain message containing a first subscription offer for the remote unit to the first address in response to the smart contact emitting the first event. The provisioning function selects the first subscription offer and sends a third blockchain message to the first address, the third blockchain message including user selection of the first subscription offer. The first blockchain interface function sends a fourth blockchain message to the first address in response to the smart contract emitting a second event indicating user selection of the first subscription offer. Here, the fourth blockchain message includes provisioning data for the remote unit generated in response to the user selection of the first offer.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6B is a continuation of the network procedure of FIG. 6A;

FIG. 8A is a block diagram illustrating one embodiment of a network procedure for re-provisioning a mobile unit;

DETAILED DESCRIPTION

Figure 1:
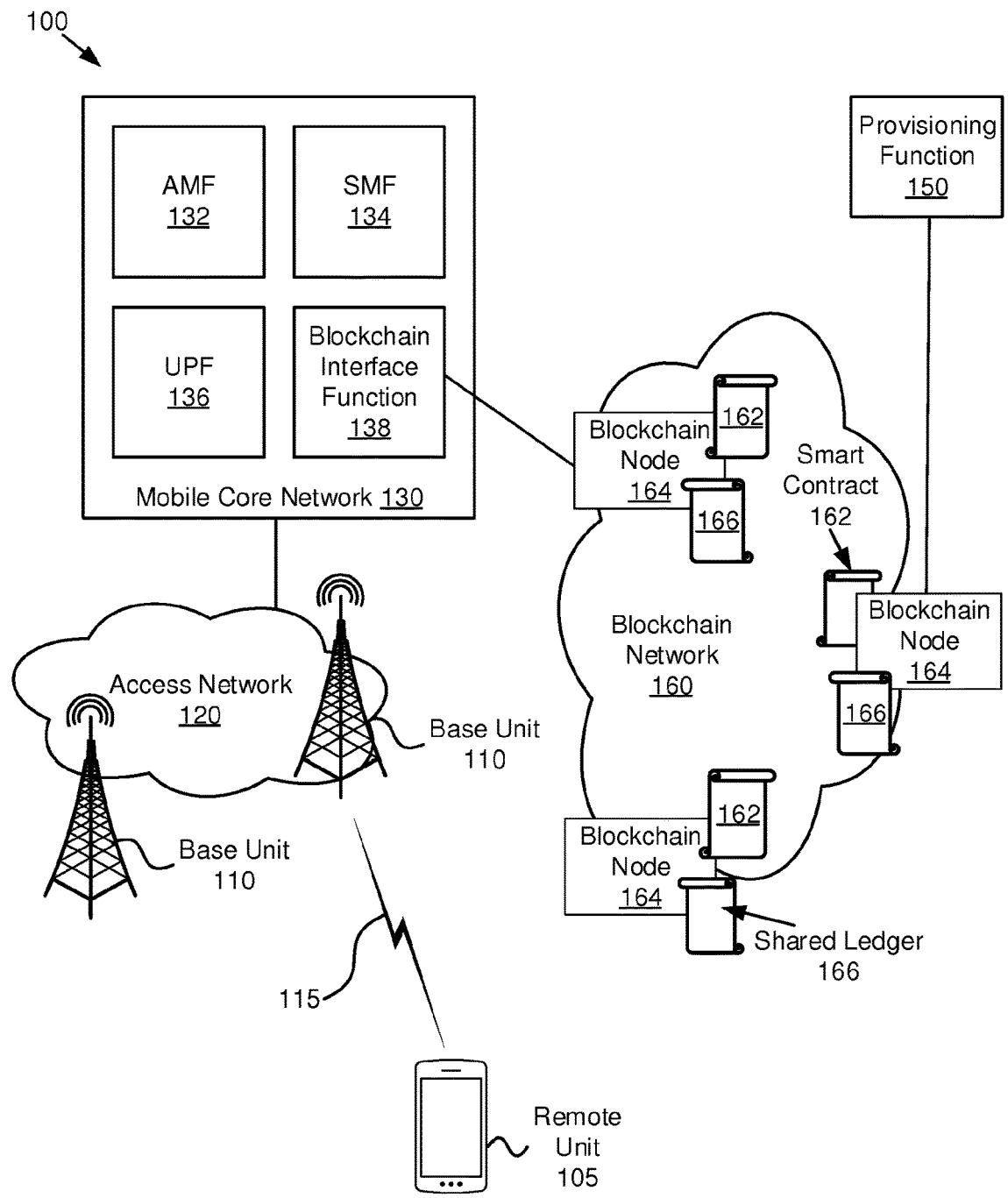
FIG. 1 is a schematic block diagram illustrating one embodiment of a wireless communication system for provisioning a remote unit via a smart contract in a blockchain network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

The disclosed embodiments consider automated procedures for both creating a subscription with a mobile network operator for a bootstrap-only UE, and remotely provision said UE with an operational profile from said mobile network operator, using a smart contract in a blockchain network.

As mentioned above, certain UEs are equipped with an eUICC containing only a bootstrap profile, yet require an operational profile (e.g., associated with a subscription with a certain network operator/carrier for normal operation). Disclosure herein are both an auction-based environment and a marketplace-like environment for subscription creation and remote provisioning of the bootstrap-only UEs, such as IoT devices. For example, a device owner may initiate an auction online calling for subscription offers from several mobile network operators, receiving subscription offers, accepting and paying for the best subscription offer, and then triggering the subscription creation and the remote provisioning of the device. The above procedure may be performed online by using a smart contract deployed in a public or private blockchain network. This smart contract provides secure and decentralizes means for linking together the UE manufacturer, the UE owner, and multiple mobile network operators that may want to offer IoT device subscriptions.

Similar procedures enable a UE to be re-provisioned, e.g., to change subscription from a source mobile network operator to a target mobile network operator, and to receive a new operational profile over-the-air that be used to connect with and obtain mobile services from the target mobile network. Again, this re-provisioning is enabled by the smart contract in the blockchain network. Note that blockchain is the technology that empowers cryptocurrencies such as Bitcoin, Ethereum, Litecoin, Dash, Neo, etc. A smart contract enables distributed applications, e.g., applications simultaneously executed in all nodes of the blockchain network.

FIG. 1 depicts a wireless communication system 100 for provisioning a remote unit via a smart contract in a blockchain network, according to embodiments of the disclosure. In one embodiment, the wireless communication system 100 includes at least one remote unit 105, an access network 120 containing at least one base unit 110, wireless communication links 115, a mobile core network 130, and a blockchain network 160. Even though a specific number of remote units 105, access networks 120, base units 110, wireless communication links 115, mobile core networks 130, and blockchain networks 160 are depicted in FIG. 1, one of skill in the art will recognize that any number of remote units 105, access networks 120, base units 110, wireless communication links 115, mobile core networks 130, and blockchain networks 160 may be included in the wireless communication system 100. In another embodiment, the access network 120 contains one or more WLAN (e.g., WI-FI™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 may serve a number of remote units 105 within a serving area, for example, a cell or a cell sector via a wireless communication link 115. The base units 110 may communicate directly with one or more of the remote units 105 via communication signals.

Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to a mobile core network 130 via the access network 120.

In one embodiment, the mobile core network 130 is a 5G core ("5GC") or the evolved packet core ("EPC"), which may be coupled to a data network, like the Internet and private data networks, among other data networks. Generally, each mobile core network 130 belongs to a single public land mobile network ("PLMN"). The present disclosure is not intended to be limited to the implementation of any particular wireless communication system architecture or protocol.

The mobile core network 130 includes several network functions ("NFs"), including the blockchain interface function ("BIF") 138, among other control plane functions and user plane functions. As understood in the art, a mobile core network may include such control plane functions as an Access and Mobility Management Function ("AMF") 132, a Session Management Function ("SMF") 134, a Policy Control Function ("PCF"). The User Plane Function ("UPF") 136 facilitates user plane operations, including, but not limited to, packet routing and forwarding, interconnection to data networks, policy enforcement, and data buffering.

The blockchain interface function 138 is a network function configured to interface with the blockchain network 160. Specifically, the blockchain interface function 138 interfaces with the blockchain network by sending messages to a smart contract 162 and listening for blockchain events emitted by the smart contract, e.g., using an API. The blockchain interface function 138 also interfaces with other functions in the mobile network (not shown) such as a Network Exposure Function ("NEF"), a Service Capability Exposure Function ("SCEF"), a Unified Data Management ("UDM"), a Home Subscriber Server ("HSS"), among other mobile network functions.

The Provisioning Function 150 is a function that creates the smart contract 162 in the blockchain, stores information in the smart contract 162 about a plurality of IoT devices and enables devices owners (e.g., via a web interface) to request and buy subscriptions for the IoT devices they own. In one example use case, the Provisioning Function 150 is owned and operated by an IoT device manufacturer. In certain embodiments, the Provisioning Function 150 may be a server (e.g., web server) providing a user interface (e.g., the web interface) accessible over a data network, such as the Internet.

The blockchain network 160 is a peer-to-peer network that maintains a secure shared ledger 166, e.g., a list of transactions that have occurred in the past. This list of transactions is organized into blocks linked together, thus the name "blockchain." The blockchain network 160 is composed of multiple (typically thousands) of blockchain nodes 164, every one of which maintains a copy of the shared ledger 166, also known as the "blockchain." Note that the blockchain network 160 contains a single ledger 166 shared among the nodes 164 of the blockchain network 160.

The blockchain network 160 provides application programming interfaces (APIs) that can be used by applications to interact with the blockchain. As an example, an application may use an API call to trigger a blockchain transaction, e.g., to transfer some funds to an account, or to be notified when his/her account receives new funds. Applications using the blockchain via appropriate APIs can be external to a blockchain node 164 or internal to a blockchain node 164. In some embodiments, the blockchain network 160 supports an external API (e.g., a JSON-RPC API) for use by external applications and a separate internal API (e.g., a JavaScript™ API) for use by the internal applications.

Some blockchains, as the blockchain network 160 depicted, support so called "smart contracts." A smart contract 162 is small program deployed in the blockchain network 160 which is stored and executed by all blockchain nodes 164. In various embodiments, the smart contract 162 is stored as part of the shared ledger 166 in all nodes 164 of the blockchain network 160. Typically, a smart contract 162 executes when prescribed conditions are met. Here, the smart contract 162 can receive certain messages, which cause the smart contract 162 to execute specific tasks and to emit events which can be monitored by entities outside the blockchain.

Note that the smart contract 162 is essentially a distributed application: it exists in all blockchain nodes 164 and it is executed simultaneously in all blockchain nodes 164. One advantage of such distributed application is improved security as it is almost impossible to hack a smart contract 162 because a hacker would have to change the contents of the shared ledger 166 in the majority of blockchain nodes 164. Deployment of a smart contract 162 is typically done by sending a blockchain transaction to an empty address in the blockchain network 160 with the byte code for the smart contract 162 as data. Note that the byte code is the code created after compiling the source code of the smart contract 162. Here, the smart contract 162 facilitates provisioning a remote unit 105, as described in greater detail below.

Figure 2:
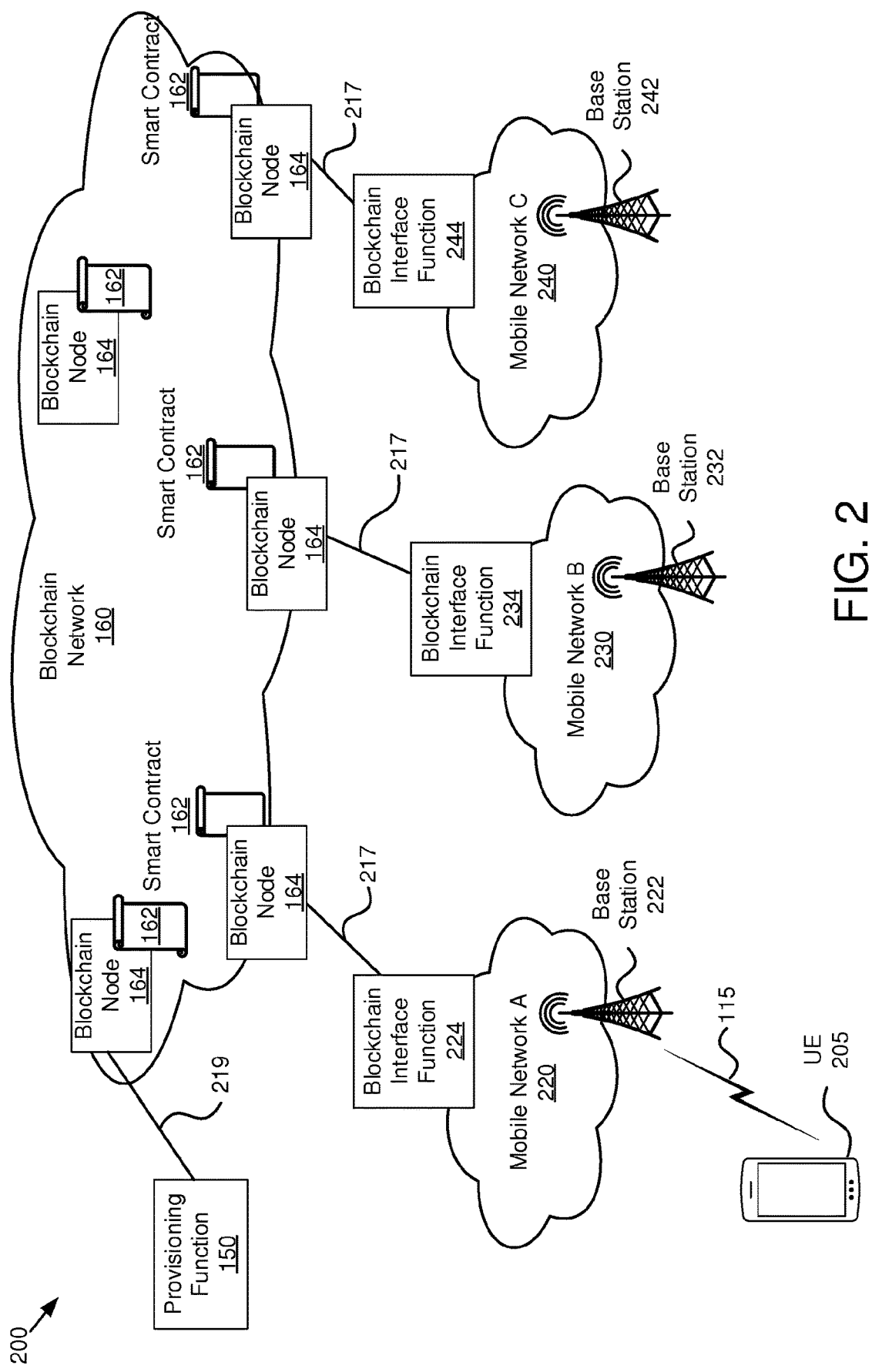
FIG. 2 is a block diagram illustrating another embodiment of a wireless communication system for provisioning a remote unit via a smart contract in a blockchain network.

FIG. 2 depicts a network architecture 200 used for provisioning a remote unit via a smart contract in a blockchain network, according to embodiments of the disclosure. The network architecture 200 may be modification of the wireless communication system 100. As depicted, the network architecture 200 includes a UE 205, multiple mobile communication networks, a provisioning function 150, and a blockchain network 160. Here, the UE 205 may be one embodiment of the remote unit 105, discussed above.

As depicted, the multiple mobile communication networks include the mobile network A 220 (containing the base station 222 and the blockchain interface function 224), the mobile network B 230 (containing the base station 232 and the blockchain interface function 234), and the mobile network C 240 (containing the base station 242 and the blockchain interface function 244). The base stations 222, 232, and 242 may each be an embodiment of the base units 110, while the blockchain interface functions 224, 234, and 244 may each be an embodiment of the blockchain interface function 138.

The blockchain network 160 supports the deployment and execution of smart contract 162s. As discussed above, the blockchain network 160 is a peer-to-peer network containing many peer nodes, called blockchain nodes 164. Multiple mobile networks interface with the blockchain and can interact with the smart contract 162 via Blockchain Interface Functions, such as the Blockchain Interface Functions 224, 234 and 244. Each Blockchain Interface Function 224, 234, 244 interfaces to the blockchain via the API 217 and interfaces also with other functions in the mobile network such as a Network Exposure Function ("NEF"), a Service Capability Exposure Function ("SCEF"), a Unified Data Management ("UDM"), a Home Subscriber Server ("HSS"), and other mobile network functions.

Functional entities outside the blockchain can interface with the blockchain network 160 and the smart contract 162 via certain APIs. For example, the Provisioning Function 150 can send messages to the smart contract 162 via the API 219, each message causing a function in the smart contract 162 to be executed. The Provisioning Function 150 can also receive events (e.g., notifications) emitted by the smart contract 162 via the API 219. Events are usually emitted to report the occurrence of an event or a state change in the smart contract 162. Similarly, a Blockchain Interface Function can send messages to the smart contract 162 and can receive events emitted by the smart contract 162 via the API 217.

The UE 205 is equipped with a eUICC that initially contains only a bootstrap profile. The UE 205 can establish communication via the wireless communication link 115 with any available mobile network (such as mobile network A 220) and can use its bootstrap profile to register with a mobile network. This registration with the bootstrap profile is then used in order to obtain an operational profile from a remote provisioning server, located inside a mobile network.

In some embodiments, the provisioning function 150 sends, to a first address in the blockchain network 160 (e.g., an address of the smart contract 162), a first blockchain message which includes information about a remote unit, such as the UE 205. Here, the information about a remote unit may be a device identity, such UE identifier. Moreover, the first blockchain message may be a Subscription Offer Request message. One or more blockchain nodes 164 contain a smart contact 162 associated with the first address, wherein the smart contact 162 emits a first blockchain event in response to the first blockchain message. Here, the first event may be a Subscription Offer Request Event. In various embodiments, the first event includes the device identity and additional device information, such as a device type and/or a device operating location.

In response to the first blockchain event, at least a first blockchain interface function, such as the blockchain interface function 224, transmits a second blockchain message containing a first subscription offer for the UE 205. Note that the first blockchain interface function is located in a first mobile communication network, such as the mobile network A 220. In certain embodiments, a second blockchain interface function, such as the blockchain interface function 234, also transmits a second blockchain message, this one containing a second subscription offer for the UE 205. Here, the second blockchain messages (e.g., Subscription Offer messages) are send to the first blockchain address.

Moreover, the provisioning function 150 may indicate selection of the first subscription offer with a third blockchain message sent to the first blockchain address. Here, the third blockchain message includes an indication of the selected offer. In certain embodiments, the third blockchain message is a Subscription Pay message that also includes payment information.

In response to the third blockchain message, the smart contract 162 emits a second blockchain event. Here, the second blockchain event indicates the user selection and includes the payment information. In certain embodiments, the second blockchain event is a Subscription Paid Event. Where the first subscription offer was selected, the first blockchain interface function confirms a payment associated with the selected offer and generates provisioning data for the UE 205 and sends a fourth blockchain message to the first address. Here, the fourth blockchain message includes the provisioning data. In one embodiment, the provisioning data includes an operational profile for the UE 205. In another embodiment, the provisioning data includes contact information for a provisioning server that downloads the operational profile to the UE 205.

In some embodiments, the second blockchain interface function also receives the provisioning data for the UE 205 in a third event emitted by the smart contract 162. Here, the provisioning data may be encrypted with a public key of the UE 205, wherein the UE 205 has a private key corresponding to the public key. Moreover, the UE 205 may initially register with the second mobile communication network prior to the first blockchain interface function remotely provisioning the UE 205. In such embodiments, the second blockchain interface function transfers the provisioning data to the UE 205, the UE 205 accesses the first blockchain interface function in response to the transfer of the provisioning data, and the first blockchain interface function remotely provisions the UE 205, e.g., in response to the UE 205 accessing the first blockchain interface function.

Figure 3:
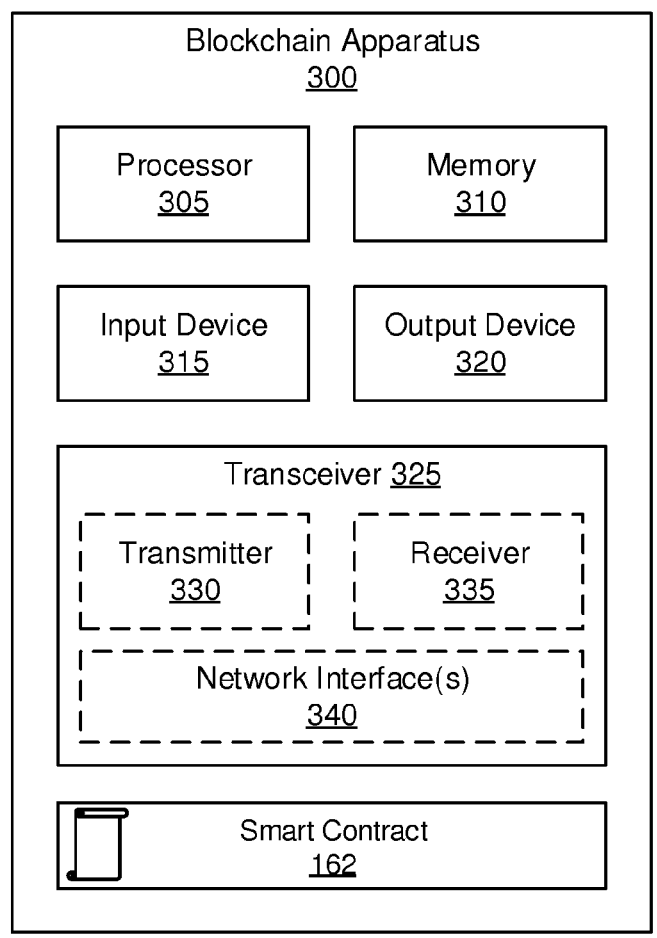
FIG. 3 a schematic block diagram illustrating one embodiment of a blockchain apparatus for provisioning a remote unit via a smart contract in a blockchain network.

FIG. 3 depicts one embodiment of a blockchain apparatus 300 that may be used for network access using blockchain payments, according to embodiments of the disclosure. The blockchain apparatus 300 may be one embodiment of the blockchain node 164. Furthermore, the blockchain apparatus 300 may include a processor 305, a memory 310, an input device 315, a display 320, and a transceiver 325. Moreover, the blockchain apparatus 300 includes a copy of the smart contract 162. In some embodiments, the input device 315 and the display 320 are combined into a single device, such as a touch screen. In certain embodiments, the blockchain apparatus 300 may not include any input device 315 and/or display 320.

As depicted, the transceiver 325 includes at least one transmitter 330 and at least one receiver 335. Additionally, the transceiver 325 may support at least one network interface 340. Here, the network interface 340 facilitates communication with a provisioning function 150 and with one or more blockchain interface functions.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the transceiver 325 receives a first blockchain message from a first blockchain address, such as a Subscription Offer Request message from an address associated with a provisioning function. In one embodiment, the first blockchain address is associated with certain permissions, such as permission to trigger the emission of a blockchain event. In certain embodiments, the first blockchain message (e.g., a Subscription Offer Request message) may include an Offer Timeframe parameter. Here, the Offer Timeframe parameter indicates an amount of time during which the various blockchain interface functions may submit a subscription offer.

In response to the processor 305 identifying the first blockchain message as a subscription offer request (and in response to the processor 305 verifying that the first blockchain message is received from the first address), the processor 305 controls the transceiver 325 to emit a first event, such as a Subscription Offer Request Event. Here, the first event includes remote unit information. In one embodiment, the remote unit information is passed to the blockchain apparatus 300 in the first blockchain message. The remote unit information may include a device identity, a device type, a device operating location, or other suitable device information.

In certain embodiments, the Subscription Offer Request event includes the Offer Timeframe parameter received in the Subscription Offer Request message. Note that the smart contract 162 is a distributed program, such that multiple blockchain apparatuses 300 each include an instance of the smart contract 162. Accordingly, the first event (e.g., a Subscription Offer Request Event) is emitted by all instances of the smart contract 162. Moreover, the emitted event may be received by multiple listeners, such as the blockchain interface functions 224, 234, and 244.

Additionally, the processor 305 collects (e.g., monitors for) one or more second blockchain messages, such as a Subscription Offer message, each second blockchain message including a subscription offer for the remote unit. In certain embodiments, the processor 305 collects a plurality of second blockchain messages. Here, each second blockchain message may be associated with a mobile communication network (e.g., service provider) offering services to the remote unit. In one embodiment, the second blockchain messages are received from Blockchain Interface Functions. Collecting the second blockchain messages may include storing the received second blockchain messages in the memory 310. In certain embodiments, each second blockchain message includes a blockchain pay-to address to which a blockchain payment is to be made upon accepting the associated subscription offer.

In some embodiments, the processor 305 limits collection of the second blockchain messages (e.g., Subscription Offer messages) to a certain timeframe. In one embodiment, this timeframe is based on the Offer Timeframe parameter received in the first blockchain message. In other embodiments, the certain timeframe may be another predefined value. After collecting the second blockchain messages for a (e.g., specified) timeframe, the processor 305 controls the transceiver 325 to send the collection to the first blockchain address. In one embodiment, the processor 305 sends the collection as a blockchain event, such as a Collected Offers Event or other suitable blockchain network event. Accordingly, the transceiver 325 may emit a blockchain event (e.g., the Collected Offer Event) in response to expiration of the Offer Timeframe, said blockchain event including the collected plurality of second blockchain messages.

The transceiver 325 receives a third blockchain message from the first blockchain address, such as a Selection Pay message, the third blockchain message including a user selection of one or the collected subscription offers. In various embodiments, the third blockchain message includes blockchain payment information. The processor 305 confirms payment corresponding to the selected subscription offer.

In response to successfully confirming the payment, the processor 305 controls the transceiver 325 to emit a second blockchain event, such as a Subscription Paid event. Here, the second blockchain event informs listeners, including those Blockchain Interface Functions which sent the second blockchain messages, that a payment was made in relation to an accepted subscription offer. The second blockchain event includes information relating to the payment, such that a Blockchain Interface Function corresponding to the selected subscription offer can confirm the payment.

Additionally, the transceiver 325 receives a fourth blockchain message from one of the Blockchain Interface Functions. Here, the fourth blockchain message includes provisioning data for the remote unit. The fourth blockchain message may be a Provisioning Request message received from the Blockchain Interface Function corresponding to the selected subscription offer. The processor 305 validates the fourth blockchain message and controls the transceiver 325 to emit a third blockchain event, such as a Provisioning Request Event. Here, the third blockchain event includes the provisioning data for the remote unit. Validating the fourth blockchain message may include the processor 305 validating a signature included in the fourth blockchain message. Here, emitting the third event occurs in response to validating the signature.

Note that the remote unit becomes provisioned after accessing a mobile network that has received the provisioning data via the third blockchain event. In various embodiments, the transceiver 325 receives a fifth blockchain message, such as a Provisioning Complete message, indicating completed provisioning of the remote unit. For example, a mobile network may download the provisioning data to the remote unit and the network's Blockchain Interface Function may then send the fifth blockchain message to the blockchain apparatus 300. Upon receiving the fifth blockchain message, the processor 305 confirms a signature included therein and controls the transceiver 325 to emit a fourth blockchain event, such as a Provisioning Complete event.

In some embodiments, each of the plurality of second blockchain messages (e.g., Subscription Offer messages) includes a blockchain pay-to address to which a blockchain payment is to be made upon accepting the associated subscription offer. Moreover, each subscription offer in a second blockchain message may include a value requested and a type, level, and/or amount of service to be provided in return. In certain embodiments, the value requested may indicate an amount in fiat currency (e.g., U.S. Dollars). In other embodiments, the value requested indicates an amount in cryptocurrency.

In certain embodiments, the payment is a transfer of some "tokens" from address-A (pay-from) to address-B (pay-to), where address-A is the blockchain address of the user who buys for the subscription and address-B is the blockchain address of the selected mobile network. Here, the address-B is the blockchain pay-to address included in the second blockchain message of the selected network. In various embodiments, the processor 305 maintains a list of {address, tokens} which shows show many tokens are owned by each address. Accordingly, a user that wants to buy a mobile subscription will need to own/acquire such kind of tokens.

As used herein, the tokens used to purchase a subscription with a mobile network are referred to as "Subscription Tokens." In one embodiment, a Subscription Token may be associated with an existing cryptocurrency, such as one supported by the blockchain network in which the blockchain apparatus 300 exists. In another embodiment, a Subscription Token may itself be a new cryptocurrency, e.g., supported by the blockchain network in which the blockchain apparatus 300 exists.

In some embodiments, the processor 305 executes a blockchain payment based on the payment information in the third message. In such embodiments, the processor 305 controls the transceiver to emit the second event in response to successfully executing the blockchain payment. Moreover, the transceiver 325 receives the fourth blockchain message after successfully executing the blockchain payment.

In certain embodiments, successfully executing the blockchain payment comprises the processor 305 verifying that the payment amount is sufficient for the user selected one of the collected subscription offers, verifying that the blockchain pay-from address owns at least an amount equal to the payment amount, and transferring the payment amount from the blockchain pay-from address to a first blockchain pay-to address based on the user selection of one of the collected subscription offers. For example, where the blockchain payment is a transfer of Subscription Tokens, the processor 305 may confirm that the first blockchain address (e.g., address-A) owns sufficient number of Subscription Tokens. In one embodiment, the processor 305 controls the transceiver to emit the second event in response to confirming that the first blockchain address owns sufficient number of Subscription Tokens.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to provisioning a remote unit via a smart contract in a blockchain network, for example blockchain addresses, token owners, provisioning data, and the like. In certain embodiments, the memory 310 also stores program code and related data, such as an operating system or other controller algorithms operating on the user blockchain apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

In certain embodiments, the transceiver 325 is configured to communicate with the provisioning function 150 and with one or more blockchain interface functions of various mobile communication networks. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335. As discussed above, the transceiver 325 may support one or more the network interface 340 for communicating with the provisioning function 150 and/or the blockchain interface functions.

Figure 4:
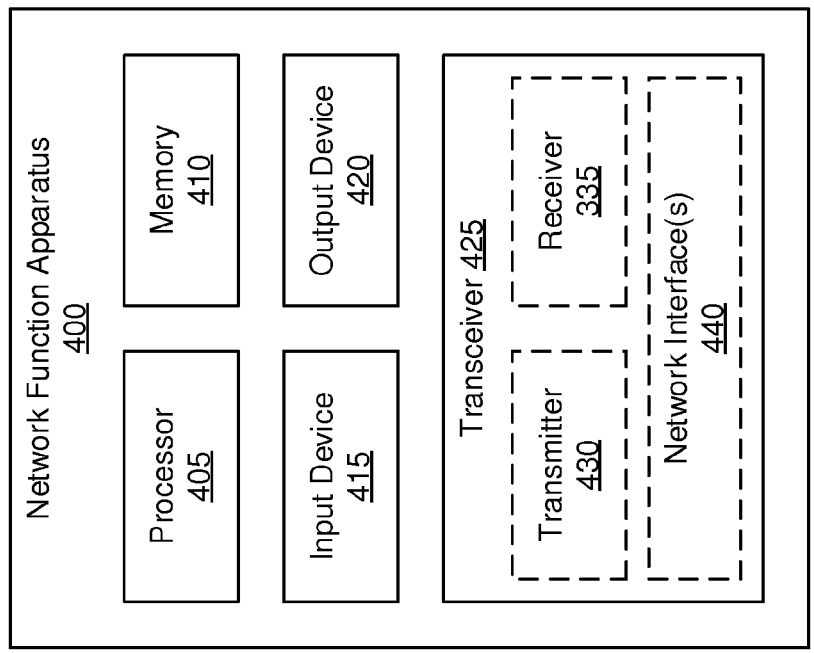
FIG. 4 a schematic block diagram illustrating one embodiment of a network function apparatus for provisioning a remote unit via a smart contract in a blockchain network.

FIG. 4 depicts one embodiment of a network function apparatus 400 that may be used for network access using blockchain payments, according to embodiments of the disclosure. The network function apparatus 400 may be one embodiment of the blockchain interface function ("BIF") 138, the BIF 224, the BIF 234, and/or the BIF 244. Furthermore, the network function apparatus 400 may include a processor 405, a memory 410, an input device 415, a display 420, and a transceiver 425. In some embodiments, the input device 415 and the display 420 are combined into a single device, such as a touch screen. In certain embodiments, the network function apparatus 400 may not include any input device 415 and/or display 420.

As depicted, the transceiver 425 includes at least one transmitter 430 and at least one receiver 435. Additionally, the transceiver 425 may support at least one network interface 440. Here, the network interface 440 facilitates communication with one or more network functions and one or more blockchain nodes 164 in the blockchain network 160.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the transceiver 425 receives a first blockchain event from a smart contract in a blockchain network. Here, the first blockchain event includes information about a remote unit. In one embodiment, the first blockchain event in a Subscription Offer Request Event. Here, the processor 405 may use the information about the remote unit to determine whether to make a first subscription offer for the remote unit. In response to deciding to make a subscription offer, the processor 405 may generate a pay-to address and control the transceiver 425 to send a first blockchain message (e.g., a Subscription Offer message) to a first blockchain address associated with the smart contract, the first blockchain message containing the first subscription offer for the remote unit and the generated pay-to address.

In certain embodiments, the transceiver 425 receives a second blockchain event from the smart contract. Here, the second event indicated user selection of a subscription offer and includes a pay-to address. The processor 405 compares the received pay-to address to the generated pay-to address to determine whether the first subscription offer was accepted. In response to the first subscription offer being accepted, the processor 405 generates provisioning data for the remote unit and transmits a second blockchain message (e.g., a Provisioning Request message) to the first blockchain address.

Moreover, the transceiver 425 receives a third blockchain event from the smart contract. Here, the third blockchain event contains provisioning data for the remote unit. If the first subscription offer was selected, then the received provisioning data will be the same as that sent in the Provisioning Request message. Otherwise, the received provisioning data will be generated by another network function in a mobile network corresponding to the selected offer.

Additionally, the processor 405 receives an indication that the remote unit is reachable and controls the transceiver 425 to transfer the received provisioning data to the remote unit. Where the first subscription offer was accepted, the processor 405 further controls the transceiver 425 to remotely provision the remote unit. Upon completion of the remote provisioning, the transceiver 425 sends a third blockchain message (e.g., a Provisioning Complete message) to the first blockchain address. Moreover, the transceiver 425 receives a fourth blockchain event (e.g., a Provisioning Complete Event) from the smart contract. Here, the fourth blockchain event conforms remote provisioning of the remote unit.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to provisioning a remote unit via a smart contract in a blockchain network, for example storing blockchain addresses, remote unit information, payment information, provisioning data, subscription offers and the like. In certain embodiments, the memory 410 also stores program code and related data, such as an operating system or other controller algorithms operating on the network function apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

In certain embodiments, the transceiver 425 is configured to communicate with the blockchain network 160 and/or a network function. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the blockchain network 160 and/or a network function.

Figure 5:
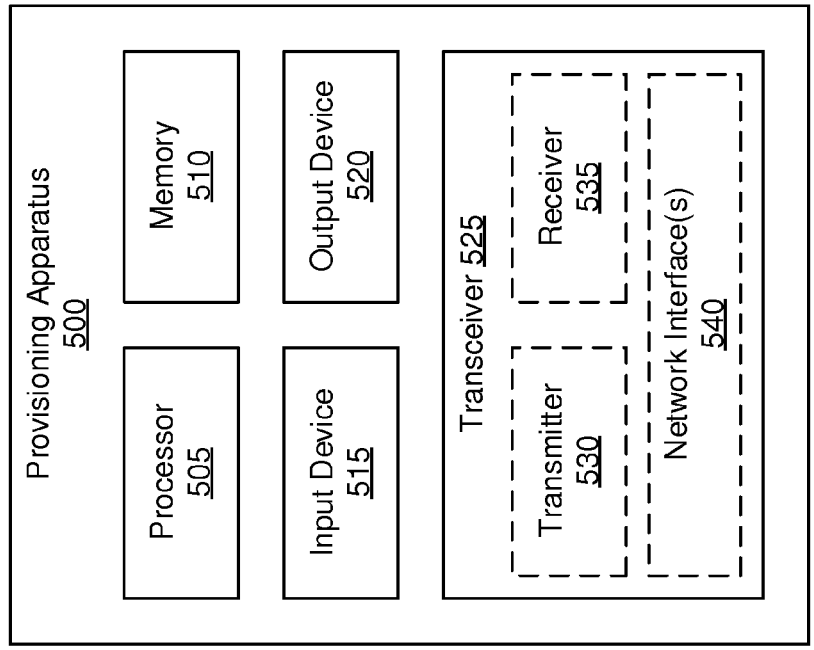
FIG. 5 a schematic block diagram illustrating one embodiment of a provisioning apparatus for provisioning a remote unit via a smart contract in a blockchain network.

FIG. 5 depicts one embodiment of a provisioning apparatus 500 that may be used for network access using blockchain payments, according to embodiments of the disclosure. The provisioning apparatus 500 may be one embodiment of the provisioning function 150. Furthermore, the provisioning apparatus 500 may include a processor 505, a memory 510, an input device 515, a display 520, and a transceiver 525. In some embodiments, the input device 515 and the display 520 are combined into a single device, such as a touch screen. In certain embodiments, the provisioning apparatus 500 may not include any input device 515 and/or display 520.

As depicted, the transceiver 525 includes at least one transmitter 530 and at least one receiver 535. Additionally, the transceiver 525 may support at least one network interface 540. Here, the network interface 540 facilitates communication with one or more blockchain nodes 164 in the blockchain network 160.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the display 520, and the transceiver 525.

In some embodiments, the processor 505 receives information about a remote unit, e.g., a remote unit needing to be provisioned. In certain embodiments, the processor 305 receives the remote unit information via the input device 515. In other embodiments, the processor 305 receives the remote unit information via the transceiver 525. In various embodiments, the information about the remote unit may be one or more of: a device identity, a device type, and a device operating location.

The processor 505 identifies a first address in a blockchain network, the first address belonging to a smart contract 162 for provisioning remote units. The processor 505 then controls the transceiver 525 to send a first blockchain message to the first blockchain address. Here, the first message includes the remote unit information. In certain embodiments, the first blockchain message is a Subscription Offer Request message.

The transceiver 525 receives a plurality of subscription offers from the blockchain network. In some embodiments, the transceiver 525 receives the plurality of subscription offers in a blockchain event, such as a Collected Offers Event or other suitable blockchain network event. In certain embodiments, the processor 505 communicates the plurality of subscription offers to a user. In one embodiment, the processor 505 communicates the plurality of subscription offers by controlling the display 520 to present the subscription offers. In another embodiment, the processor 505 communicates the plurality of subscription offers by controlling the transceiver 525 to send one or more messages to the user.

The processor 505 then selects one of the subscription offers, e.g., in response to user input, or another user interaction. Here, the user selection may be received via the input device 515. In other embodiments, the user selection may be in a message received via the transceiver 525. After receiving the user selection, the processor 505 controls the transceiver 525 to send a payment corresponding to the selected subscription offer. In one embodiment, the payment is sent to the first blockchain address. In some embodiments, the processor 505 generating a second blockchain message, such as a Selection Pay message, which contains the payment. Moreover, the second blockchain message may indicate the selected subscription offer.

In certain embodiments, the second blockchain message includes information to allow the smart contract 162 to perform a blockchain transaction on behalf of the apparatus 500. Such information may include: 1) a Transaction Identity ("TxID"), 2) one or more Inputs, and 3) one or more Outputs. Each Input may refer to a previous blockchain transaction (TxID-i) and an output in this referenced transaction (Output-n). This referenced output indicates, e.g., a cryptocurrency of the blockchain network 160 that was previously received by the user and will now be spent for making this payment. In some embodiments, the referenced output indicates a Subscription Token previously received by the user and to be used as payment for the selected subscription offer.

In addition, each Input may include a Public Key and a Signature which prove that the user owns the cryptocurrency or subscription token(s) in the referenced output, e.g., the UE 205 holds the necessary private key. One Output indicates the value (e.g., in subscription tokens and/or cryptocurrency) to be paid to the pay-to address corresponding to the selected subscription offer. An additional Output can be included to return change to the sender (e.g., when the referenced output in the Input is higher than the paid value).

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to provisioning a remote unit via a smart contract in a blockchain network, for example storing blockchain addresses, remote unit information, payment information, and the like. In certain embodiments, the memory 510 also stores program code and related data, such as an operating system or other controller algorithms operating on the provisioning apparatus 500 and one or more software applications.

The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, a vehicle dashboard, or the like.

In certain embodiments, the display 520 includes one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

In certain embodiments, the transceiver 525 is configured to communicate with the blockchain network 160. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535. As discussed above, the transceiver 525 may support one or more the network interface 540 for communicating with the blockchain network 160.

Figure 6A:
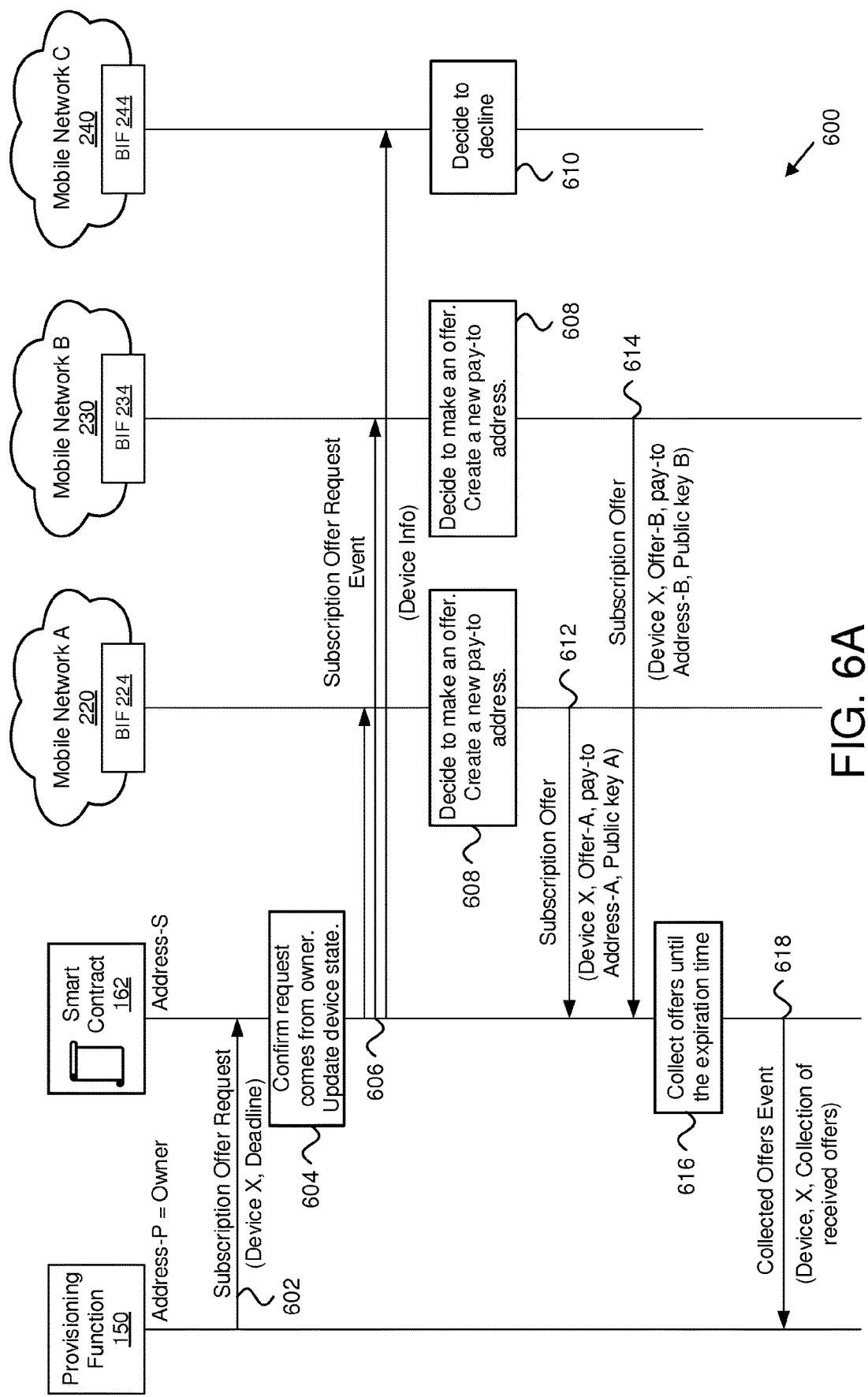
FIG. 6A is a block diagram illustrating one embodiment of a network procedure for provisioning a mobile unit.
Figure 6C:
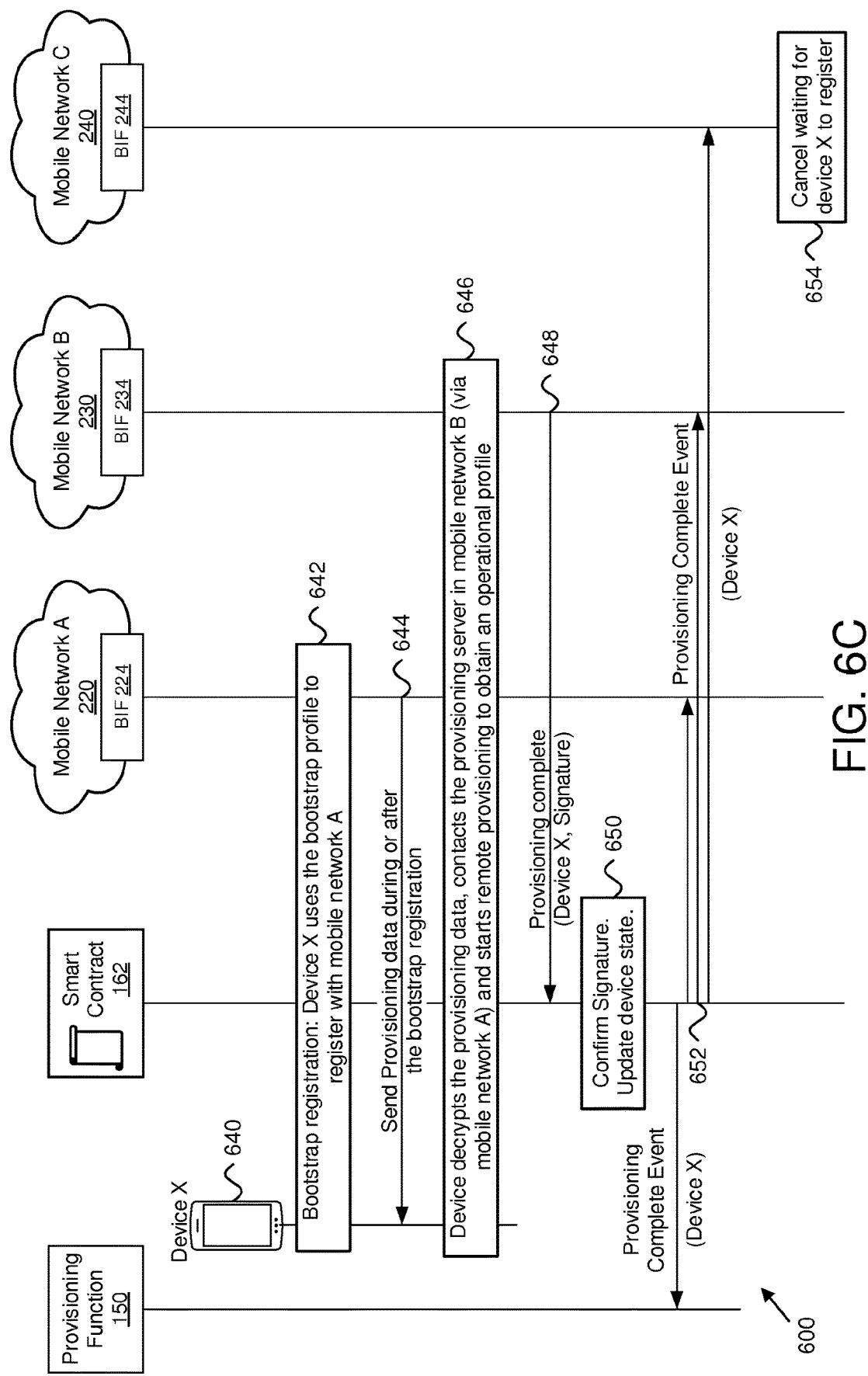
FIG. 6C is a continuation of the network procedure of FIG. 6B.

FIGS. 6A-6C depict a network procedure 600 for the provisioning of a remote unit, according to embodiments of the disclosure. The network procedure 600 depicts blockchain messages sent to the smart contract 162 which trigger the smart contract 162 to perform actions for subscription creation and initial provisioning of the remote unit. The network procedure 600 involves the provisioning function 150, the smart contract 162 (e.g., as executed by a blockchain node 164 and/or a blockchain apparatus 300), the mobile network A 220 and its blockchain interface function ("BIF") 224, the mobile network B 230 and its blockchain interface function ("BIF") 234, the mobile network C 240 and its blockchain interface function ("BIF") 244, and the Device X 640, which is the UE (remote unit) being provisioned. Here, the provisioning function 150 has a blockchain address of "Address-P" and the smart contract 162 has a blockchain address of "Address-S."

Note that the network procedure 600 assumes that the smart contract 162 has already been created in the blockchain by the provisioning function 150. The address that created the smart contract 162 (Address-P), belonging to the provisioning function 150, has been stored as the "owner" of the smart contract 162. In other words, the provisioning function 150 is also the owner of the contract. Additionally, it is assumed that the remote device being provisioned, here the Device X 640 is equipped with an embedded UICC (eUICC) that holds only a "bootstrap" profile, but does not yet have subscriptions with any mobile network and thus is not yet provisioned with an "operational" profile.

The network procedure 600 also assumes that information about several bootstrap-only UEs, such as IoT devices, has been provisioned to the smart contract 162 by the owner of the smart contract 162. For each UE (e.g., an IoT device), the smart contract 162 holds information including, but not limited to, the type of device (e.g., an electricity meter, a temperature sensor, a smart bulb, etc.), the model of the device, the device manufacturer, the public key of the device, the location of the device (e.g., GPS location or town, country, etc.), the address of the mobile network that has a subscription for this device (if any), and the like. Note that in other embodiments, the network procedure 600 may begin with the smart contract 162 receiving the device information; however, in the depicted embodiment it is assumed that the smart contract 162 already has this information.

Moreover, the network procedure 600 assumes that several mobile networks (e.g., the mobile networks 220, 230, 240) are configured to interact with the smart contract 162. Here, this interaction is accomplished via their blockchain interface functions (224, 234, 244 respectively), which implement front-end applications that interface with the blockchain network 160, e.g., via the API 217. Moreover, each of the blockchain interface functions 224, 234, 244 is configures to: (a) send messages to the smart contract 162; and (b) monitor the events emitted by the smart contract 162.

In certain embodiments, a company may purchase several IoT devices whose device information is already provisioned in the smart contract 162. In such embodiments, each one of these IoT devices may be equipped with an embedded UICC ("eUICC") that holds only a "bootstrap" profile. As discussed above, bootstrap-only UEs do not yet have subscriptions with any mobile network and also need to be provisioned with an "operational" profile, e.g., via OTA remote provisioning.

At FIG. 6A, the network procedure 600 begins with the provisioning function 150 sending a "Subscription Offer Request" message to the smart contract 162, e.g., at Address-S on the blockchain network (see signaling 602). In some embodiments, the Subscription Offer Request message is triggered by an owner of the Device X 640 interacting with the provisioning function 150 to automatically create a subscription and remotely provision the Device X 640. For example, the Device X 640 may be one of many IoT devices purchased by an individual or organization. Accordingly, the device owner (e.g., the individual or a representative of the organization) may log into the provisioning function 150, e.g., through a web interface exposed by the provisioning function 150. In certain embodiments, the device owner is presented with a list of all purchased IoT devices belonging to the individual/organization and can select one or more IoT devices from the list. In the depicted embodiment, one remote unit is selected, referred to as "Device X" 640. Via the web interface, the device owner may indicate that she/he wants to buy a new subscription from a mobile network operator for the selected device.

The Subscription Offer Request message includes an identity of the selected Device X 640. In certain embodiments, the Subscription Offer Request message may also include a deadline period. The deadline period indicates a time for when offers for this request can been accepted by the smart contract 162. Where the smart contract 162 does not already have device information for the Device X 640, the Subscription Offer Request message may also include device information (e.g., device identity, device type, device operating location, etc.).

The smart contract 162 confirms that the Subscription Offer Request message comes from the contract owner, e.g., the provisioning function 150 at Address P (see block 604). This is confirmed by the smart contract 162 validating a signature included in the Subscription Offer Request message. In various embodiments, this signature is created by using the private key of the provisioning function 150 (which is available only in the provisioning function 150) and it is confirmed by using the public key of the provisioning function 150. In certain embodiments, the provisioning function 150 sends the public key in the Subscription Offer Request message. In other embodiments, the public key may be stored at the smart contract 162 upon creation of the smart contract 162. Note that the smart contract 162 ignores the Subscription Offer Request message if it is not sent by the owner of the contract.

The smart contract 162 accepts the Subscription Offer Request and updates the state of Device X 640 (see block 606). Here, the device state is updated to indicate that subscription offers for this device are expected until the deadline period expires. In turn, the smart contract 162 emits a blockchain event, such as the "Subscription Offer Request Event" blockchain event, which is received by all blockchain interface functions (e.g., 224, 234, 244) that monitor these events of the smart contract 162 (see signaling 608).

As discussed above, a blockchain event (referred to herein as an "Event") is a specific type of message emitted to report the occurrence of an event or a state change in the smart contract 162. The "Subscription Offer Request Event" blockchain event includes information about the device for which a subscription offer is solicited (e.g., the Device X 640). This information included in the Event contains all or part of the information stored in the smart contract 162 for this device, e.g., the device identity, the type, the device operating location, etc.

Each blockchain interface function 138 that receives the Subscription Offer Request Event (here, the BIFs 224, 234, and 344) decides whether or not to offer a subscription for the device(s) whose information is included in the Event. This decision may be done automatically, e.g., by using pre-configured logic in the blockchain interface function 138, or manually by the operator of the blockchain interface function, e.g., by the personnel of the mobile network operators. The blockchain interface function 138 makes the decision using the device information included in the Event. In one embodiment, a mobile network operator may choose not to make a subscription offer when the remote unit operates in an area outside the coverage of the mobile network, or when the mobile network does not support the type of device.

In the depicted embodiment, the blockchain interface function 224 and the blockchain interface function 234 decide to make a subscription offer (see block 608). However, in the depicted embodiment the blockchain interface function 244 decides not to make an offer (see block 610). In one embodiment, this is due to the Device X 640 operating outside a coverage area of the mobile network C 240. In another embodiment, this is due to the mobile network C 240 not supporting a subscription for the device type of Device X 640.

Each blockchain interface function deciding to make a subscription offer sends a "Subscription Offer" message to the smart contract 162. In various embodiments, the Subscription Offer message includes the identity of the device for which the offer is being made, the subscription offer itself, and a pay-to address (payment address). The pay-to address contains the address of an online wallet and indicates where funds should be sent for activating the offered subscription. In certain embodiments, the pay-to address may be a blockchain address that should receive the payment.

As an example, a subscription offer may indicate a value to be paid and a service to be delivered "$15/month, unlimited data" or "$1/MB". As another example, the subscription offer may reference a cryptocurrency as the value to be transferred, for example a cryptocurrency associated with the blockchain network 160. In certain embodiments, the requested payment is a transfer of some "Subscription Tokens" to the pay-to address-B (pay-to), for example "10 Subscription Tokens/month for unlimited data." In various embodiments, the smart contract 162 maintains a list of {address, tokens} which shows show many tokens are owned by each address. Accordingly, a user that wants to buy a mobile subscription will need to own/acquire Subscription Tokens. Recall that a Subscription Token may be associated with an existing cryptocurrency or may itself be a type of cryptocurrency.

Here, the blockchain interface function 224 sends a Subscription Offer message for the Device X 640, including a subscription offer (e.g., Offer-A), a pay-to address (here, "Address A"), and a public key associated with the offer (see signaling 612). Similarly, the blockchain interface function 234 also sends a Subscription Offer message for the Device X 640, including a subscription offer (e.g., Offer-B), a pay-to address (here, "Address B"), and a public key associated with the offer (see signaling 614).

In some embodiments, each of the blockchain interface functions deciding to make a subscription offer (here, the blockchain interface function 224 and the blockchain interface function 234) creates a new pay-to address at every subscription offer in order to provide anonymity, e.g., to ensure that nobody can know which mobile network is the owner of a specific pay-to address.

The smart contract 162 collects and stores all subscription offers until the deadline period expires (see block 616). After the end of the deadline period, the smart contract 162 emits a "Collected Offers Event" blockchain event that is received by the provisioning function 150, which is configured to monitor this type of event from the smart contract 162 (see signaling 618). Here, the Collected Offers Event includes the identity of the device for which the offer is being made (e.g., the Device X 640) and a collection of received offers for the device.

Continuing at FIG. 6B, the device owner decides which subscription offer to accept, e.g., via the web interface of the provisioning function 150 (see block 620). In some embodiments, the provisioning function 150 presents the received offers to the device owner via the web interface. The device owner is now informed about the offered subscriptions for this device and she/he chooses one of the offered subscriptions. For example, the device owner may choose the subscription offered by the mobile network B 230 (e.g., "$15/month, unlimited data").

In response to selection of a subscription offer, the provisioning function 150 sends a "Subscription Pay" message to the smart contract 162 (see signaling 622). The Subscription Pay message includes the identity of the device for which the offer is being made, an indication the accepted offer (here, Offer-B), and the funds to be transferred. In certain embodiments, the Subscription Pay message transfers the funds to the smart contract 162 itself, e.g., the provisioning function 150 (Address-P) pays the smart contract 162 (Address-S), which then transfers the funds to the pay-to address associated with the accepted offer (here, Address-B). Note that the funds sent to the smart contract 162 may be an amount of Subscription Tokens, or an amount of cryptocurrency, such as bitcoins. In various embodiments, the type of currency to be used for the payments is made known when the smart contract 162 is created and advertised to mobile network operators.

When the smart contract 162 receives the Subscription Pay message, it confirms the message was sent by the contract owner (e.g., verifying the Address-P and signature), confirms that the received funds are sufficient for the accepted offer (here, Offer-B), and then transfers the received funds to the stored pay-to address associated with the accepted offer (see block 624). For example, the smart contract 162 may verify that Address-P owns sufficient Subscription Tokens for the selected offer. In the depicted embodiment, the smart contract 162 transfers the funds to Address-B which is the pay-to address provided by mobile network B 230. This transfer of funds is performed by sending a blockchain payment to the pay-to address (not depicted). Note that the smart contract 162 may not know which mobile network is associated with this pay-to address, e.g., due to the blockchain interface function 234 generating a new pay-to address for each subscription offer.

After transferring the funds to the pay-to address, the smart contract 162 emits a "Subscription Paid Event" blockchain event which includes the reference of the payment made (see signaling 626). In one embodiment, this reference is the identity of a blockchain transaction that sent the funds to the pay-to address. In another embodiment, the reference is the pay-to address of the accepted offer. Note that where Subscription Tokens are transferred, no transaction identifier may be needed, as the transfer is internal to the smart contract 162 due to the smart contract 162 maintaining the list of {address, tokens} which shows show many tokens are owned by each address.

All the blockchain interface functions 224, 234, 244 receive this Subscription Paid Event (because all monitor this type of event) and all determine if they were paid for their subscription offer or not. In the depicted embodiment, only the blockchain interface function 234 of mobile network B 230 determines that it receives a payment, e.g., because the payment reference includes its own pay-to address. Accordingly, only the blockchain interface function 234 of the mobile network B 230 acts upon this event. As noted above, the payments on the blockchain offer anonymity because the pay-to address does not reveal the identity of the mobile network that was paid. So, although the mobile network C 240 receives the Subscription Paid Event, it cannot know which other mobile network won the subscription and was paid for the subscription.

In some embodiments, the blockchain interface function 234 of the mobile network B 230 waits until the payment referenced in the Subscription Paid Event is confirmed (see block 628). In other embodiments, the blockchain interface function 234 of the mobile network B 230 only verifying that it owns the pay-to address in the Subscription Paid Event. In either case, upon confirmation the blockchain interface function 234 instructs another network function in the mobile network B 230 (e.g., the SCEF or the HSS in an EPC network, or the NEF or the UDM in a 5GC network) to create a new subscription for Device X 640 (see block 630). This new subscription includes all or part of the device information received before in the "Subscription Offer Request Event." The created subscription may also include the subscription type offered and paid for this device, e.g., "$15/month, unlimited data" according to the above example.

At this point a new subscription has been created for Device X 640, but Device X 640 still needs to be provisioned over-the-air with a eUICC operational profile that enables Device X 640 to register with and use the services of the mobile network B 230 according to its subscription. This operational profile may include security credentials and a permanent identity, different from the "device X" identity. In order to enable this provisioning of Device X 640, the blockchain interface function 234 of the mobile network B 230 sends a "Provisioning Request" message to the smart contract 162, including "provisioning data" (see signaling 632). As used herein, "provisioning data" refers to data that can be used by Device X 640 to contact a provisioning server in mobile network B 230 and retrieve the eUICC operational profile associated with its new subscription.

In some embodiments, the provisioning data may be encrypted with the Device X 640's public key (e.g., as included in the device info received with the Subscription Offer Request) and can be decrypted only by Device X 640 which holds the associated private key. This encryption may be necessary when there is need to hide sensitive information in the "provisioning data," such as the IP address and port of the provisioning server in the mobile network B 230. As depicted, the Provisioning Request message includes the identity of the device for which the offer is being made and also a signature.

Here, the signature is used by the smart contract 162 to confirm that the Provisioning Request message is sent by the same entity which sent the accepted offer (see block 634). Moreover, the smart contract 162 updates the state of device X 640 to indicate that the device is ready to be provisioned. Note again that the smart contract 162, or anybody else in the blockchain, may not know the real identity of an entity that sending a message. The smart contract 162 uses the public key associated with the accepted offer (here, public key B accompanied the Offer-B) to validate the signature in the Provisioning Request message. Thus, only the mobile network B 230, which holds the associated private key, can produce a valid signature. Note that a new public/private key pair may be generated for each subscription offer to further improve security and anonymity.

After the smart contract 162 confirms that the "Provisioning Request" message has a valid signature, e.g., confirming that it comes from the mobile network that was paid for the subscription (here the mobile network B 230), the smart contract 162 emits a "Provisioning Request Event" blockchain event that contains the identity of Device X 640 and the (e.g., encrypted) provisioning data received in the Provisioning Request message (see signaling 636). This Event informs all mobile networks that Device X 640 should receive the "provisioning data". In the depicted embodiment, the Device X 640 is not yet registered with any mobile network, so all mobile networks 220-240 wait for the Device X 640 to register (using its bootstrap profile) before taking any actions.

Continuing at FIG. 6C, the Device X 640 powers up and uses its bootstrap profile to register with mobile network A 220 (see signaling 642). The initial registration may use any appropriate procedure. Here, the Device X 640 may initially register with the mobile network A 220 due to it providing the best radio signal in the location of the Device X 640. Because the mobile network A 220 has received a Provisioning Request Event for the Device X 640, during or after the registration of the Device X 640, the mobile network A 220 will provide the received "provisioning data" to the Device X 640 (see messaging 644). The receipt and decryption of the provisioning data triggers the Device X 640 to establish connectivity with the provisioning server in the mobile network B 230 and to obtain a eUICC operational profile from the provisioning server (see signaling 646). The remote provisioning may use any appropriate procedure.

Once the remote provisioning of the Device X 640 is completed, the blockchain interface function 234 sends a "Provisioning Complete" message to the smart contract 162 (see signaling 648). In various embodiments, the Provisioning Complete message identifies the Device X 640 and also contains a signature signed with the public key associated with the accepted offer (e.g., the public key B). The smart contract 162 confirms the validity of the signature and updates the state of device X to indicate that the device is provisioned with an operational profile (see block 650). Subsequently, the smart contract 162 emits a "Provisioning Complete Event" blockchain event (see signaling 652). This Event informs all mobile networks that the provisioning of the Device X 640 is completed, so they do not need to send (or store) the "provisioning data" for the Device X 640 anymore. Thus, the mobile network C 240 cancels waiting for the Device X 640 to register. Note that the Provisioning Complete Event is also received by the provisioning function 150. In one embodiment, the provisioning function 150 may update its web interface to indicate that the provisioning of the Device X 640 is completed. The network procedure 600 ends.

Note that each of the messages sent to the smart contract 162 (e.g., the Subscription Offer Request, Subscription Offer, Subscription Pay, Provisioning Request, and Provisioning Complete messages) may first go through the blockchain "mining" process (e.g., get validated by all blockchain nodes 164 and go through the proof-of-work) before triggering the smart contract 162 to perform the above described actions. However, this mining process introduces a delay (e.g., few minutes) from when the message is sent until the smart contract 162 takes action based on the message; however, this delay is not depicted in FIGS. 6A-6C.

Further note that FIGS. 6A-6C show subscription creation and remote provisioning for a single UE (the Device X 640); however, the network procedure 600 may include simultaneous (or near-simultaneous) subscription creation and remote provisioning for multiple remote units (e.g., IoT devices). For example, the owner of multiple IoT devices (with bootstrap-only eUICCs) may choose to buy subscriptions for all or a subset of the multiple remote units. In one embodiment, multiple messages and events are sent at each of steps 602, 606, 612, 614, 618, 622, 626, 632, and 636, with one message being sent for each remote unit for which a subscription is being purchased. In other embodiments, the messages and events in steps 602, 606, 612, 614, 618, 622, 626, 632, and 636 may include information for the multiple remote units, for example a separate field for each remote unit for which a subscription is being purchased.

Figure 7:
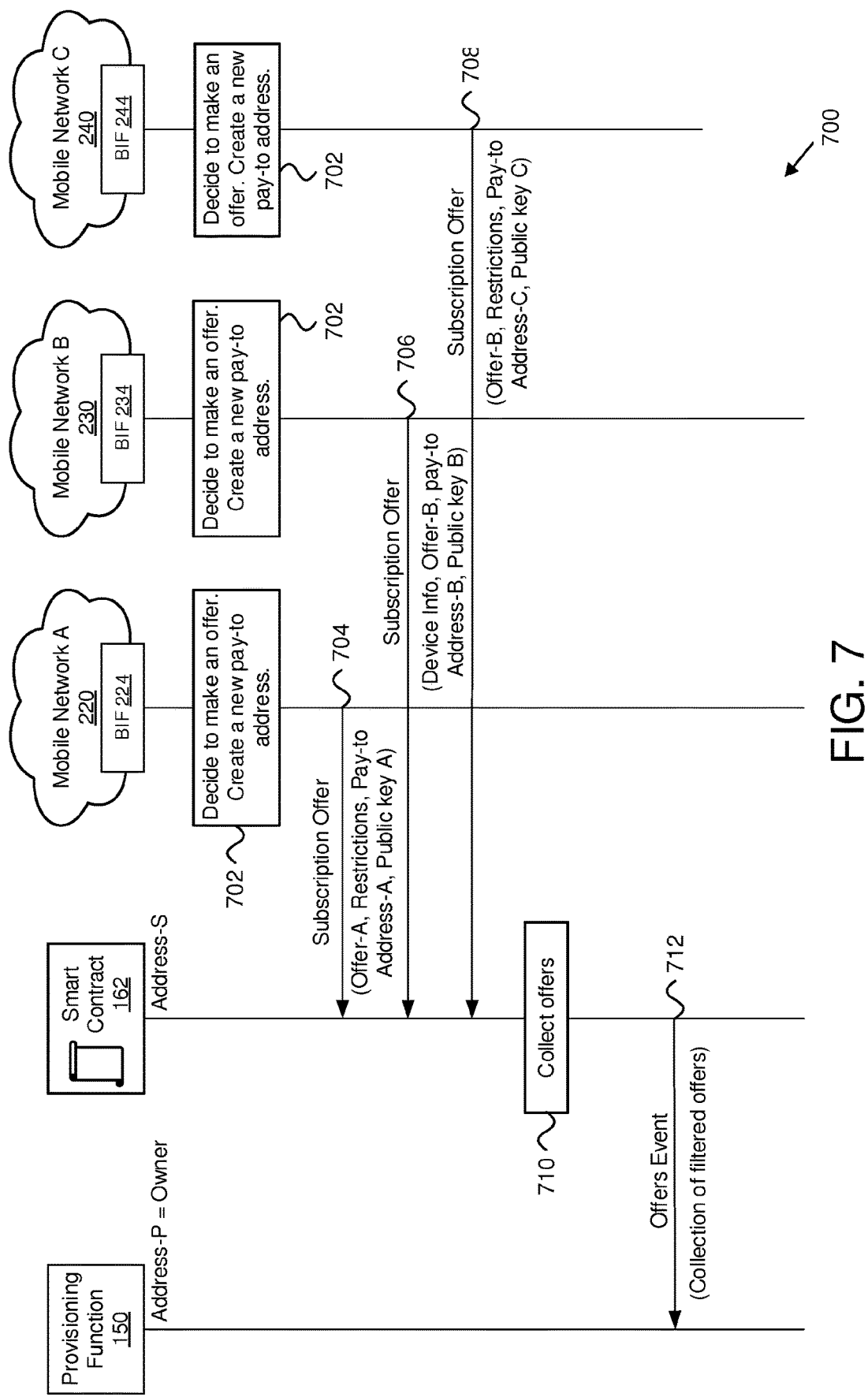
FIG. 7 is a block diagram illustrating another embodiment of a network procedure for provisioning a mobile unit.

FIG. 7 depicts a network procedure 700 for provisioning a mobile unit, according to embodiments of the disclosure. The network procedure 700 depicts alternative steps to those in FIG. 6A for collecting subscription offers. The network procedure 700 involves the provisioning function 150, the smart contract 162 (e.g., as executed by a blockchain node 164 and/or a blockchain apparatus 300), the mobile network A 220 and its blockchain interface function ("BIF") 224, the mobile network B 230 and its blockchain interface function ("BIF") 234, and the mobile network C 240 and its blockchain interface function ("BIF") 244.

Note that the network procedure 700 assumes that the smart contract 162 has already been created in the blockchain by the provisioning function 150. Moreover, the network procedure 600 assumes that several mobile networks (e.g., the mobile networks 220, 230, 240) are configured to interact with the smart contract 162. Here, this interaction is accomplished via their blockchain interface functions (224, 234, 244 respectively), which implement front-end applications that interface with the blockchain network 160, e.g., via the API 217.

At FIG. 7, the network procedure 700 begins with the BIFs 224, 234, and 244 deciding to make subscription offers available to the smart contract 162 (see block 702). This decision may be done automatically, e.g., by using pre-configured logic in the blockchain interface function 138, or manually by the operator of the blockchain interface function, e.g., by the personnel of the mobile network operators. In certain embodiments, the decision is made in response to a request, e.g., by the provisioning function, to submit subscription offers. In other embodiments, the mobile network may decide to send a subscription offer to the smart contract 162 whenever it wants, without the need to receive first an invitation or other signaling.

Upon generating the subscription offers, each of the BIFs 224, 234, and 244 create a new pay-to address, e.g., in the blockchain network 160. In certain embodiments, each BIF creates a new pay-to address at every subscription offer in order to provide anonymity, e.g., to ensure that nobody can know which mobile network is the owner of a specific pay-to address. In the example embodiment shown in the figure, each of the blockchain interface functions 224, 234, and 244 decide to make a subscription offer and each generates a new pay-to address.

In certain embodiments, a subscription offer is associated with certain restrictions. For example, a subscription offer may be limited to certain types of devices, certain areas of operation, etc. Moreover, a subscription offer may have an expiration time.

Next, the blockchain interface function 224 sends a Subscription Offer message to the smart contract 162, including a subscription offer (e.g., Offer-A), offer restrictions, a pay-to address (here, "Address A"), and a public key associated with the offer (see signaling 704). Similarly, the blockchain interface function 234 also sends a Subscription Offer message to the smart contract 162, including a subscription offer (e.g., Offer-B), offer restrictions, a pay-to address (here, "Address B"), and a public key associated with the offer (see signaling 706). The blockchain interface function 244 also sends its Subscription Offer message to the smart contract 162, including a subscription offer (e.g., Offer-C), offer restrictions, a pay-to address (here, "Address C"), and a public key associated with the offer (see signaling 708). As before, each pay-to address contains the address of an online wallet and indicates where funds should be sent for activating the offered subscription.

The smart contract 162 collects and stores all subscription offers (see block 710). At some point in time, the smart contract 162 emits a "Collected Offers Event" blockchain event that is received by the provisioning function 150, which is configured to monitor this type of event from the smart contract 162 (see signaling 712). Here, the Collected Offers Event includes the a collection of subscription offers received from the BIFs 224, 234, and 244. In certain embodiments, the smart contract 162 periodically emits a "Collected Offers Event" blockchain event. In one embodiment, the smart contract 162 emits a "Collected Offers Event" blockchain event once a certain number of offers are collected. In another embodiment, the smart contract 162 emits a "Collected Offers Event" blockchain event each time a new subscription offer is received.

At some point in time, the device owner of the Device X 640 contacts the provisioning function 150 (e.g., accesses its web interface) in order to obtain a subscription in a mobile network for the Device X 640. At this point, subscription creation and remote provisioning of the Device X 640 follows the steps described above with reference to FIGS. 6B and 6C. Accordingly, the device owner selects a subscription offer and sends a Subscription Pay message, which triggers a Subscription Paid Event. Then the mobile network associated with the selected offer sends a Provisioning Request message to the smart contract 162, which triggers a Provisioning Request Event. Finally, upon activation the Device X 640 performs an initial registration, receives the provisioning data, contacts the provisioning server in the mobile network associated with the selected offer, and is remotely provisioned. After completing the remote provisioning, the mobile network sends a Provisioning Complete message to the smart contract 162, which triggers a Provisioning Complete Event. The network procedure 700 ends.

Note that while the network procedure 600 describes an auction-like environment for subscription creation (e.g., with interested mobile network operators sending offers within the deadline period), the network procedure 700 instead describes a marketplace-like environment for subscription creation, with interested device owners perusing previously submitted subscription offers.

Figure 8B:
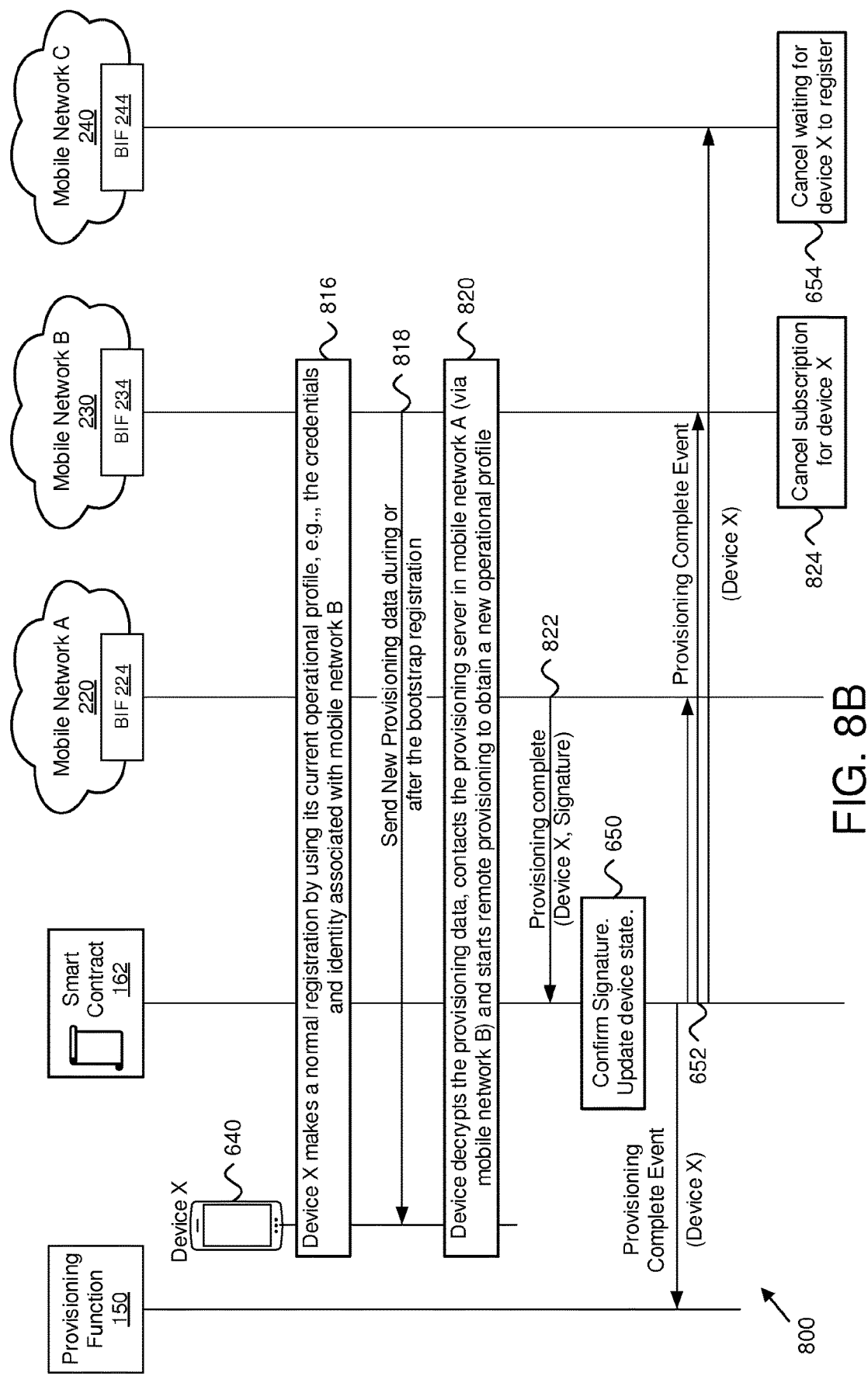
FIG. 8B is a continuation of the network procedure of FIG. 8A.

FIG. 8A-8B depict a network procedure 800 for re-provisioning a mobile unit, according to embodiments of the disclosure. The network procedure 800 continues from either FIG. 6A or FIG. 7 and depicts blockchain messages sent to the smart contract 162 which trigger the smart contract 162 to perform actions for new subscription creation and remote re-provisioning of the Device X 640, e.g., transferring the subscription of the Device X 640 from a source mobile network to a target mobile network and provisioning the Device X 640 with a new eUICC operational profile.

The network procedure 800 involves the provisioning function 150, the smart contract 162 (e.g., as executed by a blockchain node 164 and/or a blockchain apparatus 300), the mobile network A 220 and its blockchain interface function ("BIF") 224, the mobile network B 230 and its blockchain interface function ("BIF") 234, the mobile network C 240 and its blockchain interface function ("BIF") 244, and the Device X 640, which is the UE (remote unit) being re-provisioned. Here, the provisioning function 150 has a blockchain address of "Address-P" and the smart contract 162 has a blockchain address of "Address-S."

Note that the network procedure 800 assumes that the smart contract 162 has already been created in the blockchain by the provisioning function 150. Additionally, it is assumed that the Device X 640 has already been provisioned with an "operational" profile for the mobile network B 230. The network procedure 800 also assumes that the device information about the Device X 640 has been provisioned to the smart contract 162 already.

The network procedure 800 continues from either FIG. 6A or FIG. 7 with the smart contact 162 emitting a Subscription Offer Request Event and receiving Subscription Offer messages from the mobile network A 220 and the mobile network B 230. Moreover, the smart contract 162 sends all or a part of the collected offers to the provisioning function 150 for the device owner to consider.

At FIG. 8A, the device owner decides which subscription offer to accept, e.g., via the web interface of the provisioning function 150 (see block 620). For example, the device owner may choose the subscription offered by the mobile network A 220 (e.g., "$1/MB"). In response to selection of a subscription offer, the provisioning function 150 sends a "Subscription Pay" message to the smart contract 162 (see signaling 802).

The Subscription Pay message includes the identity of the device for which the offer is being made, an indication the accepted offer (here, Offer-A), and the funds to be transferred. In certain embodiments, the Subscription Pay message transfers the funds to the smart contract 162 itself, e.g., the provisioning function 150 (Address-P) pays the smart contract 162 (Address-S), which then transfers the funds to the pay-to address associated with the accepted offer (here, Address-A).

When the smart contract 162 receives the Subscription Pay message, it confirms the message was sent by the contract owner (e.g., verifying the Address-P and signature), confirms that the received funds are sufficient for the accepted offer (here, Offer-A), and then transfers the received funds to the stored pay-to address associated with the accepted offer (see block 804). In the depicted embodiment, the smart contract 162 transfers the funds to Address-A which is the pay-to address provided by mobile network A 220. This transfer of funds is performed by sending a blockchain payment to the pay-to address (not depicted). Note that the smart contract 162 may not know which mobile network is associated with this pay-to address, e.g., due to the blockchain interface function 224 generating a new pay-to address for each subscription offer.

After transferring the funds to the pay-to address, the smart contract 162 emits a "Subscription Paid Event" blockchain event which includes the reference of the payment made (see signaling 806). In one embodiment, this reference is the identity of a blockchain transaction that sent the funds to the pay-to address. All the blockchain interface functions 224, 234, 244 receive this event (because all monitor this type of event) and all determine if they were paid for their subscription offer or not. In the depicted embodiment, only the blockchain interface function 224 of mobile network A 220 determines that it receives a payment, e.g., because the payment reference includes its own pay-to address.

The blockchain interface function 224 of the mobile network A 220 waits until the payment referenced in the Subscription Paid Event is confirmed (see block 808). Then, the blockchain interface function 224 instructs another network function in the mobile network A 220 (e.g., the SCEF or the HSS in an EPC network, or the NEF or the UDM in a 5GC network) to create a new subscription for Device X 640 (see block 810). This new subscription includes all or part of the device information received before in the "Subscription Offer Request Event." The created subscription may also include the subscription type offered and paid for this device, e.g., "$1/MB" according to the above example.

At this point a new subscription has been created for Device X 640, and the Device X 640 needs to be re-provisioned over-the-air with an eUICC operational profile that enables Device X 640 to register with and use the services of the mobile network A 220 according to its new subscription. In order to enable this provisioning of Device X 640, the blockchain interface function 224 of the mobile network A 220 sends a "Provisioning Request" message to the smart contract 162, including "provisioning data" (see signaling 812). Here, the provisioning data contains information to be used by Device X 640 to contact a provisioning server in mobile network A 220 and retrieve the new eUICC operational profile associated with its new subscription. As discussed above, the provisioning data may be encrypted with the Device X 640's public key.

The smart contract 162 confirms that the Provisioning Request message is sent by the same entity which sent the accepted offer and updates the state of device X 640 (see block 634). After the smart contract 162 confirms that the "Provisioning Request" message has a valid signature, e.g., confirming that it comes from the mobile network that was paid for the subscription (here the mobile network A 220), the smart contract 162 emits a "Provisioning Request Event" blockchain event that contains the identity of Device X 640 and the (e.g., encrypted) provisioning data received in the Provisioning Request message (see signaling 636). This Event informs all mobile networks that Device X 640 should receive the "provisioning data". In the depicted embodiment, the mobile networks 220-240 wait for the Device X 640 to register (using its bootstrap profile) before taking any actions. The Device X 640 will receive the new "provisioning data" when it registers with a mobile network by using its current eUICC operational profile (i.e. by using its existing subscription with mobile network B 230).

Continuing at FIG. 6C, the Device X 640 makes a normal registration with mobile network B 230 (see signaling 642). Note that the Device X 640 can use its current eUICC operational profile to register either with the mobile network B 230 or with another mobile network that has roaming agreements with the mobile network B 230. In both cases, however, the Device X 640 receives the new provisioning data (corresponding to the new subscription with the mobile network A 220) and will start a new remote provisioning procedure (this time with a provisioning server in mobile network A 220) in order to obtain a new eUICC operational profile (see signaling 818 and 820). The remote provisioning may use any appropriate procedure.

Once the remote provisioning of the Device X 640 is completed, the blockchain interface function 224 sends a "Provisioning Complete" message to the smart contract 162 (see signaling 822). In various embodiments, the Provisioning Complete message identifies the Device X 640 and also contains a signature signed with the public key associated with the accepted offer (e.g., the public key A). The smart contract 162 confirms the validity of the signature and updates the state of device X to indicate that the device is provisioned with its new operational profile (see block 650). Subsequently, the smart contract 162 emits a "Provisioning Complete Event" blockchain event (see signaling 652). This Event informs all mobile networks that the provisioning of the Device X 640 is completed, so they do not need to send (or store) the "provisioning data" for the Device X 640 anymore.

Because the Device X 640 is transferring from mobile network B 230 to mobile network A 220, the mobile network B 230 cancels its subscription for Device X 640 in response to receiving the Provisioning complete event (see block 824). Moreover, the mobile network C 240 cancels waiting for the Device X 640 to register. Note that the Provisioning Complete Event is also received by the provisioning function 150. In one embodiment, the provisioning function 150 may update its web interface to indicate that the provisioning of the Device X 640 is completed. The network procedure 800 ends.

Figure 9:
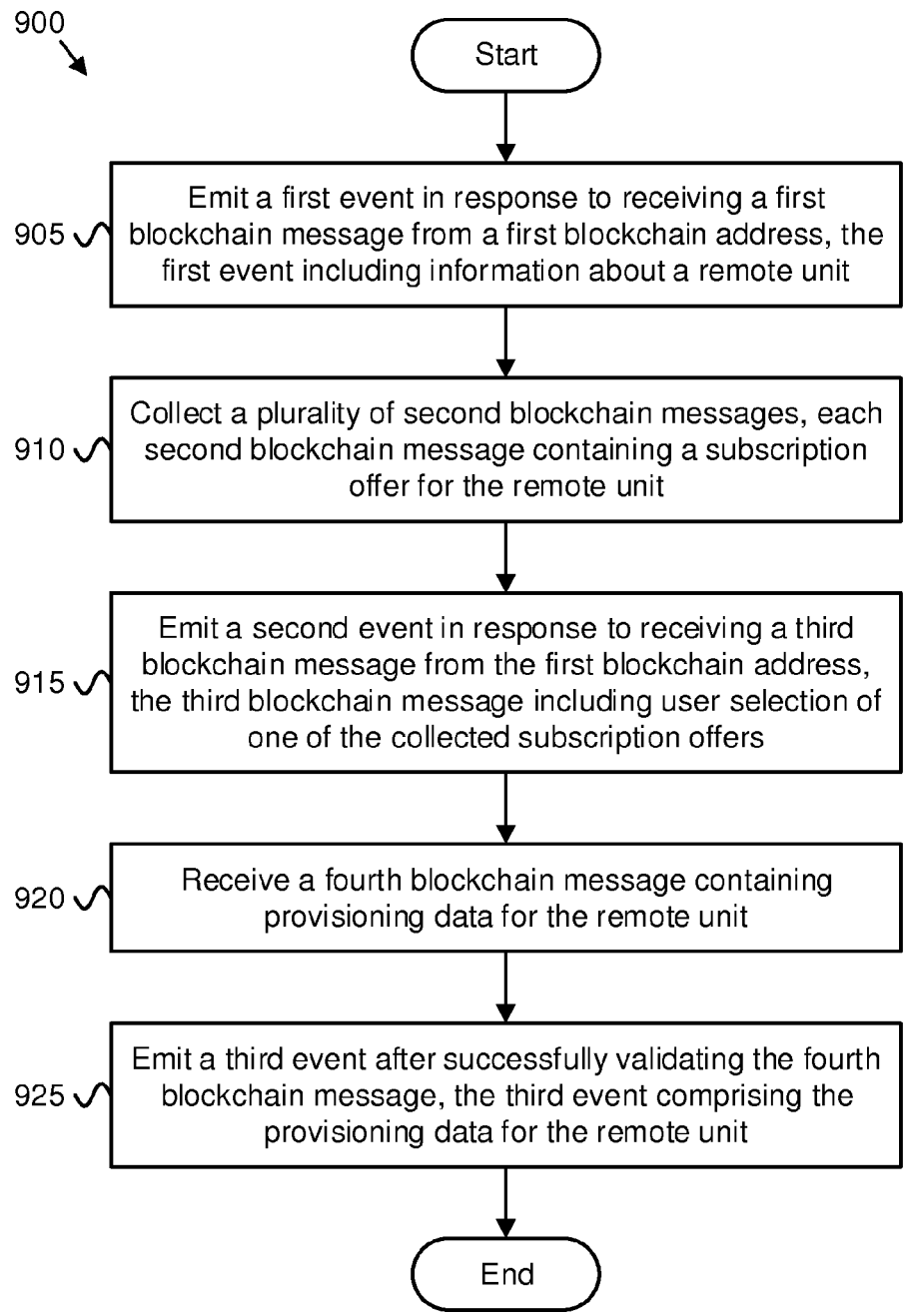
FIG. 9 is a schematic flow chart diagram illustrating one embodiment of a method for provisioning a remote unit via a smart contract in a blockchain network

FIG. 9 depicts a method 900 for network access using blockchain payments, according to embodiments of the disclosure. In some embodiments, the method 900 is performed by an apparatus, such as the smart contract, a blockchain node 164, and/or the blockchain apparatus 300. In certain embodiments, the method 900 may be performed by a processor executing program code, for example, a microcontroller, a microprocessor, a CPU, a GPU, an auxiliary processing unit, a FPGA, or the like.

The method 900 begins with emitting 905 a first event in response to receiving a first blockchain message from a first blockchain address, the first event including information about a remote unit. In one embodiment, the first blockchain message is a subscription offer request from a provisioning function. In certain embodiments, the first blockchain message further includes an offer timeframe. In such embodiments, emitting 905 a first event includes indicating the offer timeframe. In some embodiments, the information about the remote unit comprises one or more of: a device identity, a device type, and a device operating location.

The method 900 includes collecting 910 a plurality of second blockchain messages, each second blockchain message containing a subscription offer for the remote unit. Where the first blockchain message includes an offer timeframe, then collecting 910 a plurality of second blockchain messages includes accepting second blockchain messages during the offer timeframe. In some embodiments, the plurality of second blockchain messages each includes a blockchain pay-to address to which a blockchain payment is to be made upon accepting the associated subscription offer. In one embodiment, the collected offers are emitted in a blockchain event (e.g., a Collected Offers Event) in response to expiration of the offer timeframe.

The method 900 includes emitting 915 a second event in response to receiving a third blockchain message from the first blockchain address, the third blockchain message including user selection of one of the collected subscription offers. Here, the third blockchain message may include payment information. In such embodiments, emitting 915 the second event occurs in response to successfully executing a blockchain payment based on the payment information. In one embodiment, successfully executing the blockchain payment comprises: verifying that the payment amount is sufficient for the user selected one of the collected subscription offers, verifying that the blockchain pay-from address owns at least an amount equal to the payment amount, and transferring the payment amount from the blockchain pay-from address to a first blockchain pay-to address based on the user selection of one of the collected subscription offers.

The method 900 includes receiving 920 a fourth blockchain message containing provisioning data for the remote unit. In one embodiment, receiving 920 a fourth blockchain message occurs in response to successfully executing the blockchain payment. The method 900 includes emitting 925 a third event after successfully validating the fourth blockchain message, the third event including the provisioning data for the remote unit. In certain embodiments, the fourth blockchain message includes a signature, wherein emitting 925 the third event occurs in response to successfully validating the signature. The method 900 ends.

Figure 10:
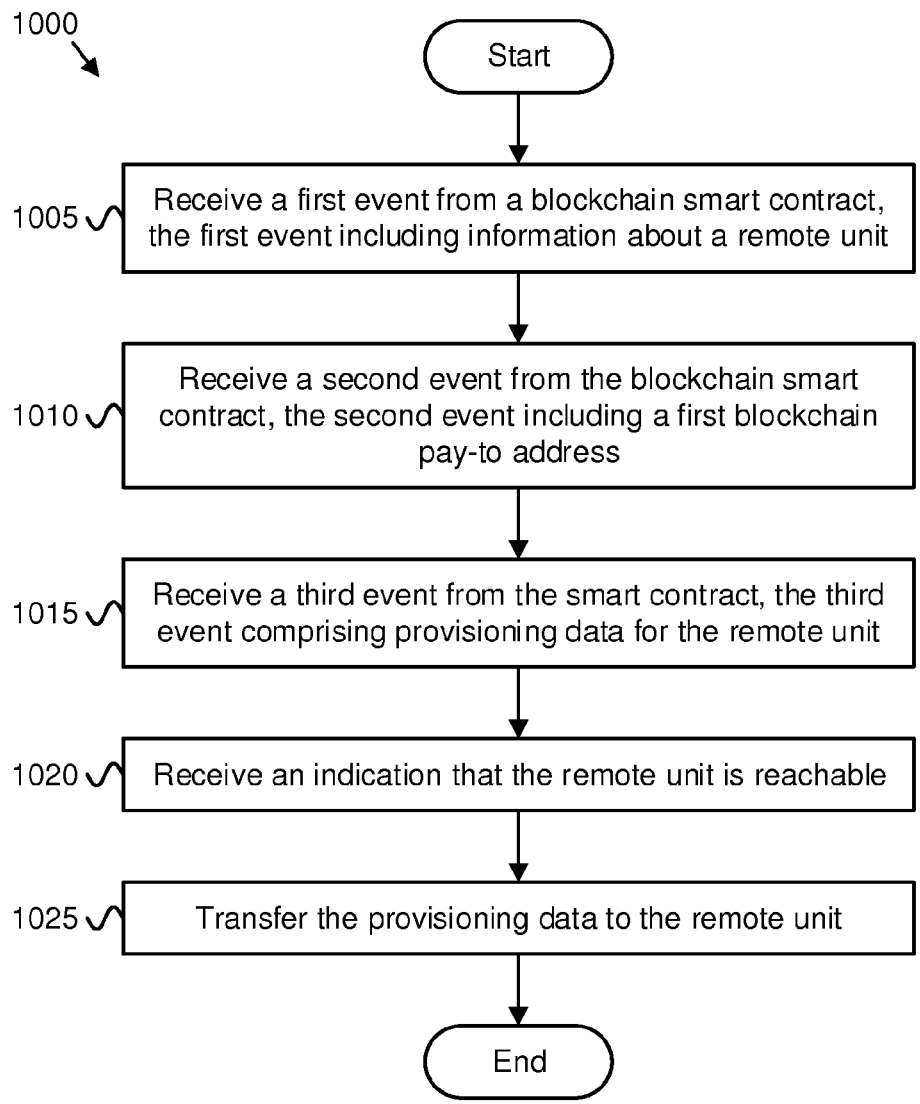
FIG. 10 is a schematic flow chart diagram illustrating a second embodiment of a method for provisioning a remote unit via a smart contract in a blockchain network.

FIG. 10 depicts a method 1000 for network access using blockchain payments, according to embodiments of the disclosure. In some embodiments, the method 1000 is performed by an apparatus, such as the blockchain interface function 138, the blockchain interface function 224, the blockchain interface function 234, the blockchain interface function 244, and/or the network function apparatus 400. In certain embodiments, the method 1000 may be performed by a processor executing program code, for example, a microcontroller, a microprocessor, a CPU, a GPU, an auxiliary processing unit, a FPGA, or the like.

The method 1000 begins with receiving 1005 a first blockchain event from a blockchain smart contract, the first event including information about a remote unit. In one embodiment, the first blockchain event is a Subscription Offer Event. In certain embodiments, the first blockchain event includes an offer timeframe. In some embodiments, the information about the remote unit comprises one or more of: a device identity, a device type, and a device operating location. In certain embodiments, receiving 1005 the first blockchain event triggers sending a first blockchain message in response to the first blockchain event. Here, the first blockchain message comprises a subscription offer for the remote unit and a pay-to address (e.g., a second pay-to address). In one embodiment, the subscription offer is based on the information about the remote unit.

The method 1000 includes receiving 1010 a second event from the blockchain smart contract, the second event including a first blockchain pay-to address. The second blockchain event includes information relating to a payment made to the first blockchain pay-to address. In one embodiment, the second blockchain event is a Subscription Paid event. Here, the second blockchain event indicates that a payment was made in relation to an accepted subscription offer. In certain embodiments, receiving 1010 the second event triggers determining whether the subscription offer was accepted based on the first blockchain pay-to address and a pay-to address included in the first blockchain message.

The method 1000 includes receiving 1015 a third event from the smart contract, the third event including provisioning data for the remote unit. The method 1000 includes receiving 1020 an indication that the remote unit is reachable. The method 1000 includes transferring 1025 the provisioning data to the remote unit. The method 1000 ends.

Figure 11:
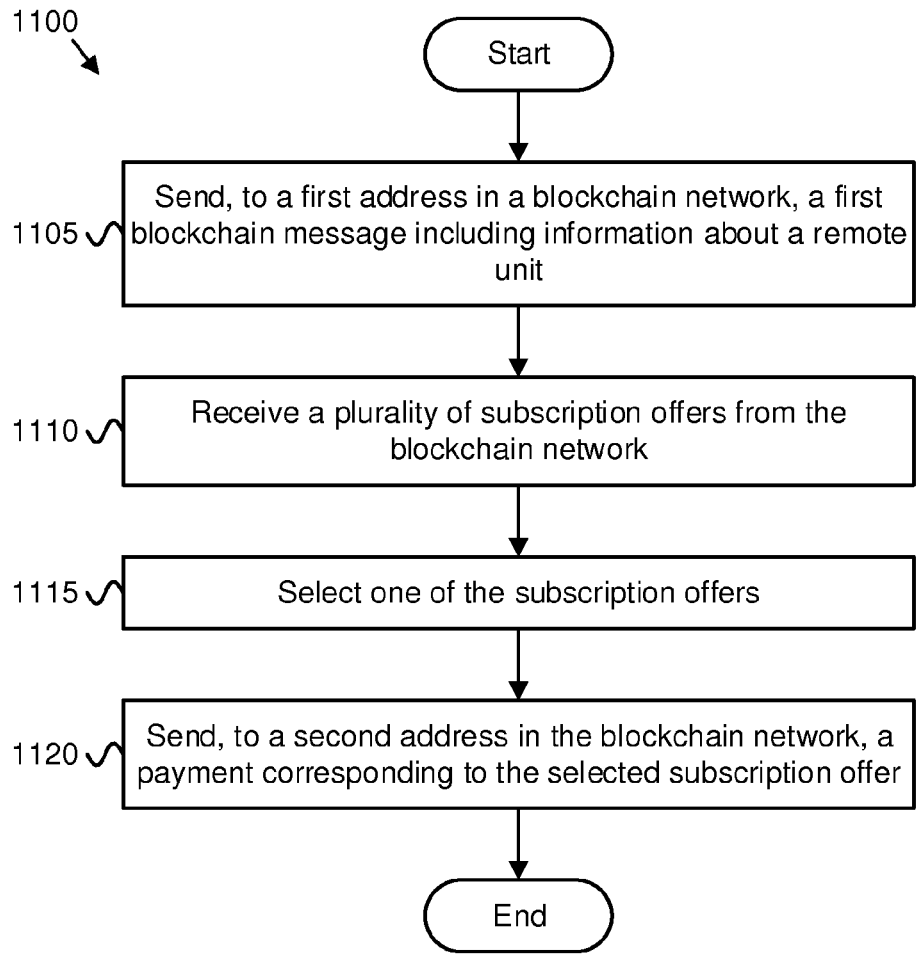
FIG. 11 is a schematic flow chart diagram illustrating a third embodiment of a method for provisioning a remote unit via a smart contract in a blockchain network.

FIG. 11 depicts a method 1100 for network access using blockchain payments, according to embodiments of the disclosure. In some embodiments, the method 1100 is performed by an apparatus, such as the provisioning function 150 and/or the provisioning apparatus 500. In certain embodiments, the method 1100 may be performed by a processor executing program code, for example, a microcontroller, a microprocessor, a CPU, a GPU, an auxiliary processing unit, a FPGA, or the like.

The method 1100 begins with sending 1105, to a first address in a blockchain network, a first blockchain message including information about a remote unit. Here, the first address in the blockchain network (also referred to as the first "blockchain address") is the address of a smart contract used for coordinating subscription offers and provisioning UEs. The method 1100 includes receiving 1110 a plurality of subscription offers from the blockchain network. In other embodiments, receiving 1110 a plurality of subscription offers includes receiving the offers in a blockchain event, such as a Collected Offers Event or other suitable blockchain network event.

The method 1100 includes selecting 1115 one of the subscription offers, e.g., based on user input. In certain embodiments, each of the plurality of subscription offers includes a blockchain pay-to address to which a blockchain payment is to be made upon accepting the associated subscription offer. Moreover, each subscription offer may include a value requested and a type, level, and/or amount of service to be provided in return. In certain embodiments, the value requested may indicate an amount in fiat currency (e.g., USD). In other embodiments, the value requested indicates an amount in cryptocurrency. The method 1100 includes sending 1120, to the first address in the blockchain network, a payment corresponding to the selected subscription offer. The method 1100 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a blockchain network, the method comprising:
   receiving, by a receiver and from a provisioning function, a blockchain transaction comprising executable code corresponding to a smart contract;
   deploying the smart contract to the blockchain network, wherein the smart contract is associated with a blockchain address and comprises a distributed application;
   receiving, by the receiver and at the smart contract, a first blockchain message identifying a user equipment (UE) lacking an operational profile, wherein the first blockchain message comprises a first signature;
   validating, by a processor, the first signature based at least in part on a public key corresponding to a public/private key pair;
   transmitting, by a transmitter, a first notification message in response to validating the first signature, wherein the first notification message including information about the UE;
   receiving, by the receiver, a plurality of second blockchain messages, each second blockchain message containing a subscription offer for the UE;
   receiving, by the receiver, a third blockchain message indicating a selection of a particular subscription offer;
   transmitting, by the transmitter, a second notification message in response to validating the third blockchain message, the second notification message comprising information about the particular subscription offer;
   receiving, by the receiver, a fourth blockchain message in response to transmitting the second notification message, the fourth blockchain message comprising provisioning data for the UE;
   encrypting, by the processor, the provisioning data using an encryption key associated with the UE; and
   transmitting, by the transmitter, a third notification message in response to receiving the fourth blockchain message, the third notification message comprising the encrypted provisioning data.

2. The method of claim 1, wherein encrypting the provisioning data using the encryption key associated with the UE comprises encrypting the provisioning data using a public key of a public/private key pair of the UE.

3. The method of claim 1, wherein the first blockchain message further includes an offer timeframe, wherein the first notification message comprises the offer timeframe, and wherein receiving the plurality of second blockchain messages comprises accepting second blockchain messages during the offer timeframe.

4. The method of claim 3, further comprising transmitting, by the transmitter, a fourth event in response to expiration of the offer timeframe, the fourth notification message comprising the received plurality of second blockchain messages.

5. The method of claim 1, wherein the information about the UE comprises one or more of: a device identity, a device type, and a device operating location.

6. The method of claim 1, wherein the plurality of second blockchain messages each include a blockchain pay-to address to which a blockchain payment is to be made upon accepting the associated subscription offer.

7. The method of claim 1, wherein the third blockchain message includes payment information, the method further comprising:
executing, by the processor, a blockchain payment based on the payment information, wherein transmitting the second notification message occurs in response to successfully executing the blockchain payment.

8. The method of claim 7, wherein the payment information comprises a blockchain pay-from address and a payment amount, wherein successfully executing the blockchain payment comprises:
verifying that the payment amount is sufficient for the particular subscription offer;
verifying that the blockchain pay-from address owns at least an amount equal to the payment amount; and
transferring the payment amount from the blockchain pay-from address to a first blockchain pay-to address based on the third blockchain message.

9. The method of claim 1, wherein the fourth blockchain message includes a signature, the method further comprising:
validating the signature, wherein transmitting the third notification message occurs in response to validating the signature.

10. The method of claim 1, further comprising:
receiving, by the receiver, a fifth blockchain message indicating a completion of a provisioning of the UE;
confirming a signature in the fifth blockchain message; and
transmitting, by the transmitter, a fourth blockchain event confirming the provisioning of the UE.

11. An apparatus in a blockchain network, the apparatus comprising:
at least one memory; and
at least one processor coupled with the at least one memory and configured to cause the apparatus to:
receive, via a receiver and from a provisioning function, a blockchain transaction comprising executable code corresponding to a smart contract;
deploy the smart contract to the blockchain network, wherein the smart contract is associated with a blockchain address and comprises a distributed application;
receive, via the receiver and at the smart contract, a first blockchain message identifying a user equipment (UE) lacking an operational profile, wherein the first blockchain message comprises a first signature;
validate the first signature based at least in part on a public key corresponding to a public/private key pair;
transmit, via a transmitter, a first notification message in response to validating the first signature, wherein the first notification message including information about the UE;
receive, via the receiver, a plurality of second blockchain messages, each second blockchain message containing a subscription offer for the UE;
receive, via the receiver, a third blockchain message indicating a selection of a particular subscription offer;
transmit, via the transmitter, a second notification message in response to validating the third blockchain message, the second notification message comprising information about the particular subscription offer;
receive, via the receiver, a fourth blockchain message in response to transmitting the second notification message, the fourth blockchain message comprising provisioning data for the UE; and
encrypt the provisioning data using an encryption key associated with the UE; and
transmit, via the transmitter, a third notification message in response to receiving the fourth blockchain message, the third notification message comprising the encrypted provisioning data.

12. The apparatus of claim 11, wherein to encrypt the provisioning data using the encryption key associated with the UE, the at least one processor is configured to cause the apparatus to encrypt the provisioning data using a public key of a public/private key pair of the UE.

13. The apparatus of claim 11, wherein the first blockchain message further includes an offer timeframe, wherein the first notification message comprises the offer timeframe, and wherein to receive the plurality of second blockchain messages, the at least one processor is configured to cause the apparatus to accept second blockchain messages during the offer timeframe.

14. The apparatus of claim 13, wherein the at least one processor is configured to cause the apparatus to transmit, via the transmitter, a fourth notification message in response to expiration of the offer timeframe, the fourth notification message comprising the received plurality of second blockchain messages.

15. The apparatus of claim 11, wherein the information about the UE comprises one or more of: a device identity, a device type, and a device operating location.

16. The apparatus of claim 11, wherein the plurality of second blockchain messages each include a blockchain pay-to address to which a blockchain payment is to be made upon accepting the associated subscription offer.

17. The apparatus of claim 11, wherein the third blockchain message includes payment information, wherein the at least one processor is configured to cause the apparatus to execute a blockchain payment based on the payment information, wherein emitting the second notification message occurs in response to successfully execution of the blockchain payment.

18. The apparatus of claim 17, wherein the payment information comprises a blockchain pay-from address and a payment amount, wherein successfully execute the blockchain payment, the at least one processor is configured to cause the apparatus to:
verifying that the payment amount is sufficient for the particular subscription offer;
verify that the blockchain pay-from address owns at least an amount equal to the payment amount; and
transfer the payment amount from the blockchain pay-from address to a first blockchain pay-to address based on the third blockchain message.

19. The apparatus of claim 11, wherein the fourth blockchain message includes a signature, wherein the at least one processor is configured to cause the apparatus to validate the signature, wherein transmitting the third notification message occurs in response to validating the signature.

20. The apparatus of claim 11, wherein the at least one processor is configured to:
- receive, via the receiver, a fifth blockchain message indicating a completion of a provisioning of the UE,
- confirm confirms a signature in the fifth blockchain message, and
- transmit, via the transmitter, a fourth blockchain event confirming the provisioning of the UE.

* * * * *